United States Patent
Morris et al.

(10) Patent No.: US 11,931,975 B2
(45) Date of Patent: Mar. 19, 2024

(54) FORMING SYSTEMS AND METHODS FOR FORMING AN ELONGATE CHARGE OF COMPOSITE MATERIAL

(71) Applicant: The Boeing Company, Chicago, IL (US)

(72) Inventors: John Dempsey Morris, Seattle, WA (US); Derek John Flolid, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 28 days.

(21) Appl. No.: 17/581,025

(22) Filed: Jan. 21, 2022

(65) Prior Publication Data

US 2022/0266544 A1    Aug. 25, 2022

Related U.S. Application Data

(60) Provisional application No. 63/151,481, filed on Feb. 19, 2021.

(51) Int. Cl.
| | |
|---|---|
| *B29C 70/34* | (2006.01) |
| *B29C 70/44* | (2006.01) |
| *B29L 31/30* | (2006.01) |

(52) U.S. Cl.
CPC .......... *B29C 70/342* (2013.01); *B29C 70/443* (2013.01); *B29L 2031/3076* (2013.01)

(58) Field of Classification Search
CPC ....... B29C 70/34; B29C 70/342; B29C 70/40; B29C 70/44
See application file for complete search history.

(56) References Cited

U.S. PATENT DOCUMENTS

| | | |
|---|---|---|
| 3,540,079 A | 11/1970 | Bush |
| 3,614,811 A | 10/1971 | Johnson |
| 4,568,588 A | 2/1986 | Fujiki et al. |

(Continued)

FOREIGN PATENT DOCUMENTS

| | | |
|---|---|---|
| GB | 2486231 A | 6/2012 |
| WO | WO2012076875 | 6/2012 |
| WO | WO2012148472 | 11/2012 |

OTHER PUBLICATIONS

European Patent Office, Extended European Search Report for related European patent application EP 22154856.3, dated Jul. 6, 2022.

*Primary Examiner* — Yunju Kim
(74) *Attorney, Agent, or Firm* — Kolitch Romano Dascenzo Gates LLC

(57) ABSTRACT

Forming systems and methods for forming an elongate charge of composite material are disclosed herein. The forming systems include an elongate forming tool having an elongate forming surface with a forming surface shape that corresponds to a predetermined material shape for the elongate charge of composite material. The forming systems also include an elongate end effector, which is configured to tension the elongate charge of composite material across the forming surface. The elongate end effector includes an elongate vacuum distribution manifold, a porous elongate vacuum region, and an elongate friction surface. The methods include methods of tensioning an elongate charge of composite material across an elongate forming surface of an elongate forming tool utilizing an elongate end effector.

20 Claims, 9 Drawing Sheets

(56) References Cited

U.S. PATENT DOCUMENTS

| | | |
|---|---|---|
| 5,015,168 A | 5/1991 | Boime et al. |
| 5,092,954 A | 3/1992 | Braun et al. |
| 5,340,301 A | 8/1994 | Saffire et al. |
| 5,348,602 A | 9/1994 | Makarenko et al. |
| 5,427,518 A | 6/1995 | Morizot et al. |
| 6,814,916 B2 | 11/2004 | Willden et al. |
| 7,959,753 B2 | 6/2011 | Nunez Delgado et al. |
| 8,029,719 B2 | 10/2011 | Petersson et al. |
| 8,052,826 B2 | 11/2011 | Burpo et al. |
| 8,142,181 B2 | 3/2012 | Willden et al. |
| 8,236,222 B2 | 8/2012 | Henderson et al. |
| 8,465,613 B2 | 6/2013 | Rotter et al. |
| 8,601,694 B2 | 12/2013 | Brennan et al. |
| 9,023,265 B1 | 5/2015 | Rotter et al. |
| 9,144,959 B1 | 9/2015 | Rotter et al. |
| 9,464,642 B2 | 10/2016 | Ilievski et al. |
| 9,541,094 B2 | 1/2017 | Iwakiri et al. |
| 9,573,301 B2 | 2/2017 | Kline et al. |
| 9,914,268 B2 | 3/2018 | Coxon et al. |
| 10,086,596 B2 | 10/2018 | Desjardien et al. |
| 10,150,233 B2 | 12/2018 | Kline et al. |
| 2005/0042323 A1 | 2/2005 | Habisreitinger et al. |
| 2008/0105128 A1 | 5/2008 | Yang |
| 2009/0091052 A1 | 4/2009 | Pridie |
| 2009/0320292 A1 | 12/2009 | Brennan et al. |
| 2012/0153531 A1 | 6/2012 | Rober et al. |
| 2013/0036922 A1* | 2/2013 | Stewart .................... B30B 5/02 100/211 |
| 2015/0352795 A1 | 12/2015 | Coxon et al. |
| 2017/0057100 A1* | 3/2017 | Shaw ................ B29D 99/0014 |
| 2019/0184693 A1* | 6/2019 | Johnson .................. B29C 70/38 |
| 2020/0101677 A1* | 4/2020 | Kendall ............. B29C 66/0326 |
| 2021/0245453 A1 | 8/2021 | Phillips et al. |
| 2021/0245458 A1 | 8/2021 | Phillips et al. |

* cited by examiner

FORMING SYSTEMS AND METHODS FOR FORMING AN ELONGATE CHARGE OF COMPOSITE MATERIAL

RELATED APPLICATION

The present application is a non-provisional of and claims priority to U.S. Provisional Patent Application No. 63/151,481, filed on Feb. 19, 2021, entitled "FORMING SYSTEMS AND METHODS FOR FORMING AN ELONGATE CHARGE OF COMPOSITE MATERIAL," the complete disclosure of which is incorporated by reference.

FIELD

The present disclosure relates generally to forming systems and methods for forming an elongate charge of composite material.

BACKGROUND

Composite parts have become common in many products. Such composite parts generally include a plurality of charges of composite material, which may be positioned adjacent to one another and/or layered and subsequently cured to define the composite part.

Some applications, such as aircraft, may include elongate composite parts with lengths on the order of meters. For such elongate composite parts, it may be challenging to efficiently and/or precisely position, layer, and/or shape a plurality of elongate charges of composite material and/or to do so without introducing defects, such as wrinkles, into the composite part. The forming process may be especially challenging for relatively long, skinny composite parts, when the composite part includes bends or complex shapes, and/or when fibers, within a given elongate charge of composite material, extend longitudinally along the length of the bends. Thus, there exists a need for improved forming systems and methods for forming an elongate charge of composite material.

SUMMARY

Forming systems and methods for forming an elongate charge of composite material are disclosed herein. The forming systems include an elongate forming tool having an elongate forming surface with a forming surface shape that corresponds to a predetermined material shape for the elongate charge of composite material. The forming systems also include an elongate end effector, which is configured to tension the elongate charge of composite material across the forming surface. The elongate end effector includes an elongate vacuum distribution manifold, a porous elongate vacuum region, and an elongate friction surface. The elongate vacuum distribution manifold includes a vacuum inlet, which is configured to receive the applied vacuum, and a vacuum outlet. The porous elongate vacuum region is configured to receive the applied vacuum from the vacuum outlet and to generate a pressure differential that is configured to retain the elongate charge of composite material in contact with the porous elongate vacuum region. The elongate friction surface extends along a length of the porous elongate vacuum region and is configured to generate a frictional force that resists a sliding motion between the elongate end effector and the elongate charge of composite material.

The methods include positioning the elongate charge of composite material on the elongate forming surface and attaching an attached region of the elongate charge of composite material to the elongate forming surface. The methods also include applying an applied vacuum to generate a pressure differential across the porous elongate vacuum region of the elongate end effector and retaining a retained region of the elongate charge of composite material on the porous elongate vacuum region via the pressure differential. During the retaining, the methods include moving the elongate end effector away from the attached region of the elongate charge of composite material to tension the elongate charge of composite material across the elongate forming surface. During the moving and with the elongate end effector, the methods include resisting a sliding motion between the elongate charge of composite material and the end effector when a shear force between the elongate charge of composite material and the elongate end effector is less than a threshold shear force magnitude. During the moving, the methods further include permitting the sliding motion when the shear force is greater than the threshold shear force magnitude.

DESCRIPTION

Figure 1:
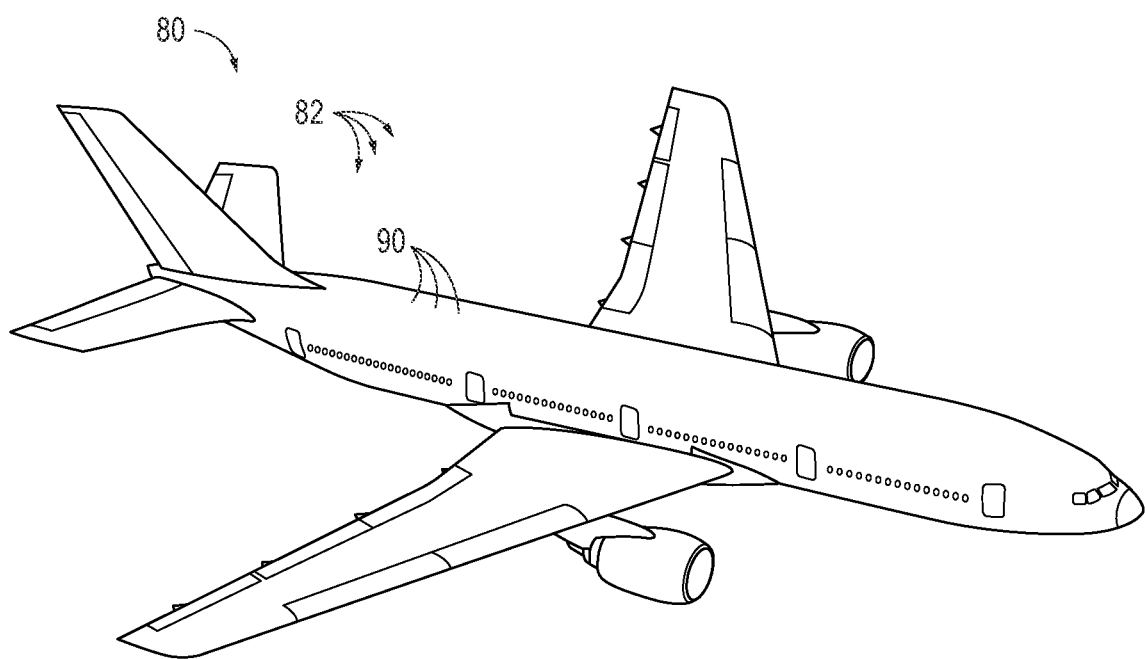
FIG. 1 is a schematic illustration of an example of an aircraft that may include a plurality of composite parts formed utilizing forming systems and/or methods, according to the present disclosure.

FIGS. 1-11 provide illustrative, non-exclusive examples of forming systems 10, elongate end effectors 100, and/or methods 200, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure. Stated another way, elements that generally will be, but are not required to be, included in a specific embodiment of the invention are illustrated in solid lines, while additional features that may be included in the specific embodiment are illustrated in dashed lines. With this in mind, and as discussed in more detail herein, Figures that include dashed lines generally illustrate a plurality of different embodiments, including those with structures that generally are included in the embodiment as well as structures that optionally may be included to form other and/or alternative embodiments.

FIG. 1 is a schematic illustration of an example of an aircraft 80. Aircraft 80 may include a plurality of composite parts 82, and composite parts 82 may include and/or may be formed from one or more elongate charges of composite material 90. Elongate charges of composite material 90 may be formed into composite parts 82 with, via, and/or utilizing forming systems 10 and/or elongate end effectors 100, according to the present disclosure. Examples of composite parts 82 include a wing of the aircraft, a component of the wing of the aircraft, a tail of the aircraft, a component of the tail of the aircraft, a stabilizer of the aircraft, a component of the stabilizer of the aircraft, a fuselage of the aircraft, and/or a component of the fuselage of the aircraft.

Figure 2:
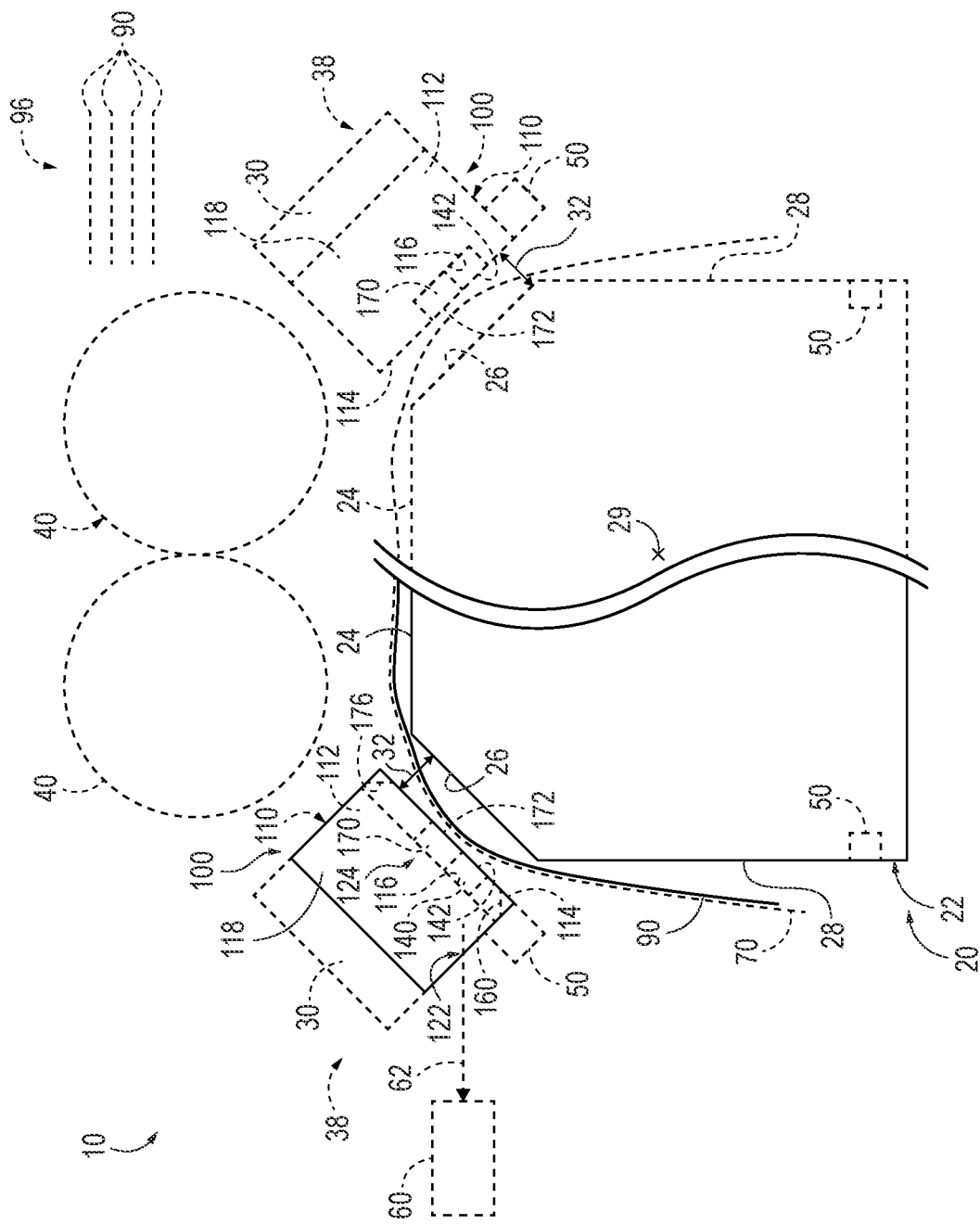
FIG. 2 is a schematic end view illustrating examples of a forming system that includes an elongate end effector, according to the present disclosure.
Figure 6:
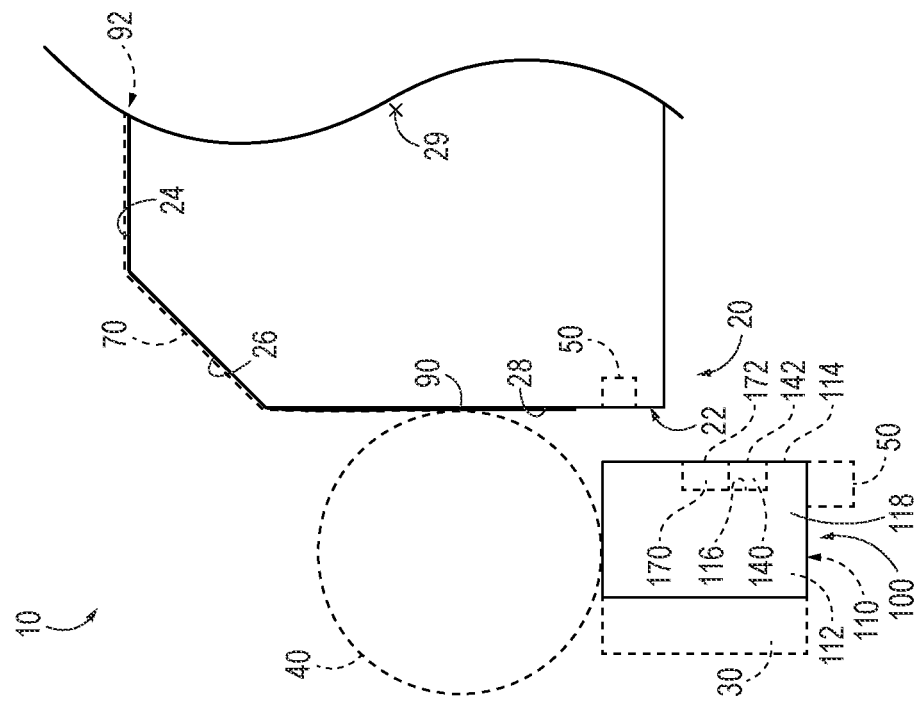
FIG. 6 is a schematic end view illustrating examples of a forming process performed utilizing a forming system that includes an elongate end effector, according to the present disclosure.
Figure 7:
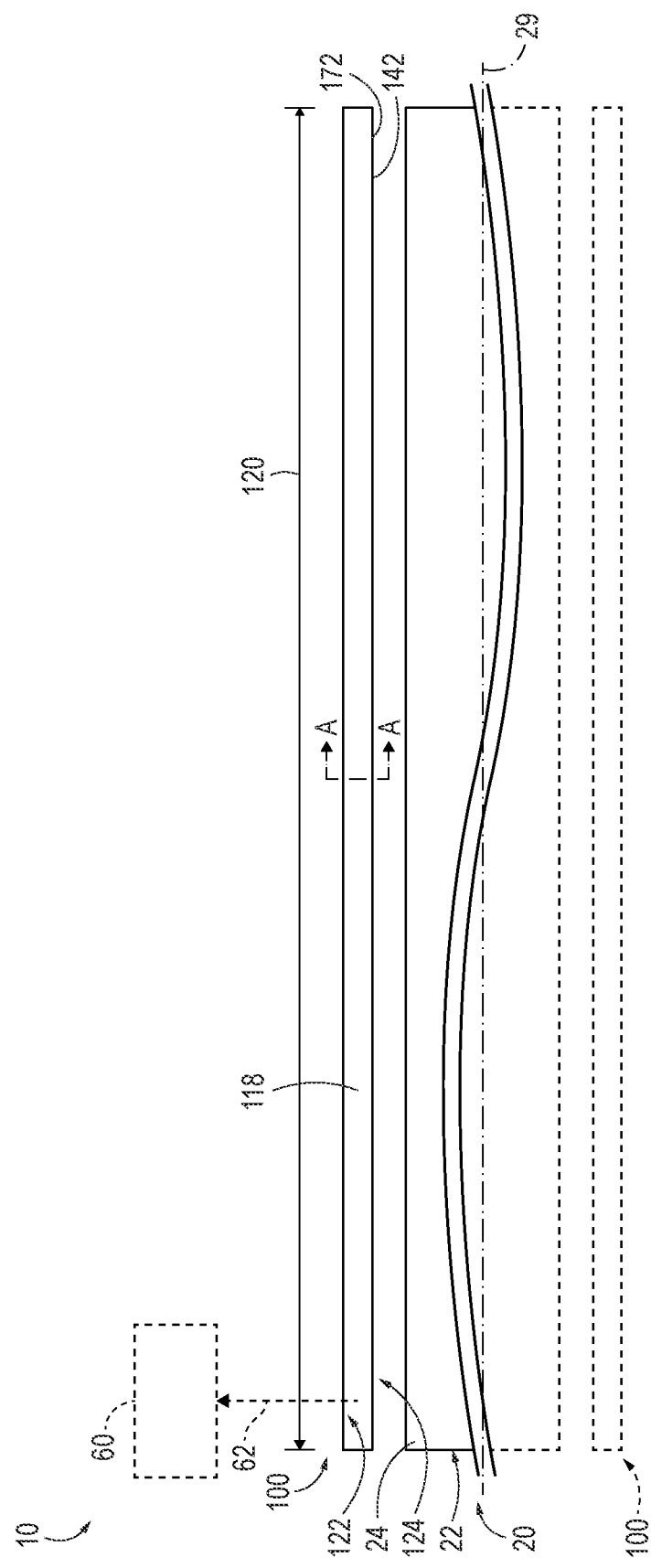
FIG. 7 is a schematic top view illustrating examples of a forming system that includes an elongate end effector, according to the present disclosure.

FIG. 2 is a schematic end view illustrating examples of a forming system 10 that includes an elongate end effector 100, according to the present disclosure. FIGS. 3-6 are schematic end views illustrating examples of a forming process performed utilizing a forming system 10 that includes an elongate end effector 100, according to the present disclosure. FIG. 7 is a schematic top view illustrating examples of a forming system 10 that includes an elongate end effector 100, according to the present disclosure. Forming systems 10 may be configured to form an elongate charge of composite material 90, which also may be referred to herein as an elongate charge 90, to a predefined material shape.

As collectively illustrated by FIGS. 2-7, forming systems 10 includes an elongate forming tool 20 and at least one elongate end effector 100. Elongate forming tool 20 has an elongate forming surface 22 with a forming surface shape that corresponds to the predefined material shape and/or that is configured to form the elongate charge of composite material to, or into, the predetermined material shape.

Elongate end effector 100 may be configured to tension elongate charge of composite material 90 along and/or across elongate forming surface 22. As discussed in more detail herein, elongate end effector 100 includes an elongate vacuum distribution manifold 118 and a porous elongate vacuum region 142. Elongate vacuum distribution manifold 118 includes a vacuum inlet 122, which is configured to receive an applied vacuum 62, and a vacuum outlet 124. Porous elongate vacuum region 142 is configured to receive applied vacuum 62 from vacuum outlet 124 and to generate a pressure differential. The pressure differential, when present, is configured to selectively urge elongate charge of composite material 90 toward and/or into contact with porous elongate vacuum region 142. Additionally or alternatively, the pressure differential may be configured to retain elongate charge of composite material 90 in contact with porous elongate vacuum region 142.

Forming systems 10 may include single-sided elongate forming tools 20 that may be associated with a single elongate end effector 100, such as illustrated in solid lines in FIGS. 2 and 7. Additionally or alternatively, forming systems 10 may include multi-sided elongate forming tools 20 that may be associated with a plurality of elongate end effectors 100, such as illustrated by the combination of solid and dashed lines in FIGS. 2 and 7. With this in mind, FIGS. 3-6 illustrate the forming process being performed on a single side of elongate forming tools 20 and/or utilizing a single elongate end effector 100; however, it is within the scope of the present disclosure that a similar, or corresponding, forming process may be performed, or concurrently performed, on another side of elongate forming tools 20 and/or utilizing another elongate end effector 100.

As illustrated in dashed lines in FIGS. 2-6, forming system 10 also may include an end effector positioning structure 30. End effector positioning structure 30 may be operatively attached to, may be associated with, and/or may be configured to operatively translate elongate end effector 100. This may include operative translation of elongate end effector 100 relative to elongate forming surface 22 and/or to tension elongate charge 90 across elongate forming surface 22, as discussed in more detail herein.

As also illustrated in dashed lines in FIGS. 2-6, forming system 10 may include a compaction structure 40. Compaction structure 40, when present, may be configured to compact elongate charge of composite material 90 against elongate forming surface 22, as discussed in more detail herein.

As also illustrated in dashed lines in FIGS. 2-6, forming system 10 may include a charge positioning structure 50. Charge positioning structure 50, when present, may be configured to selectively urge elongate charge of composite material into contact with elongate end effector 100, as discussed in more detail herein.

Figure 3:
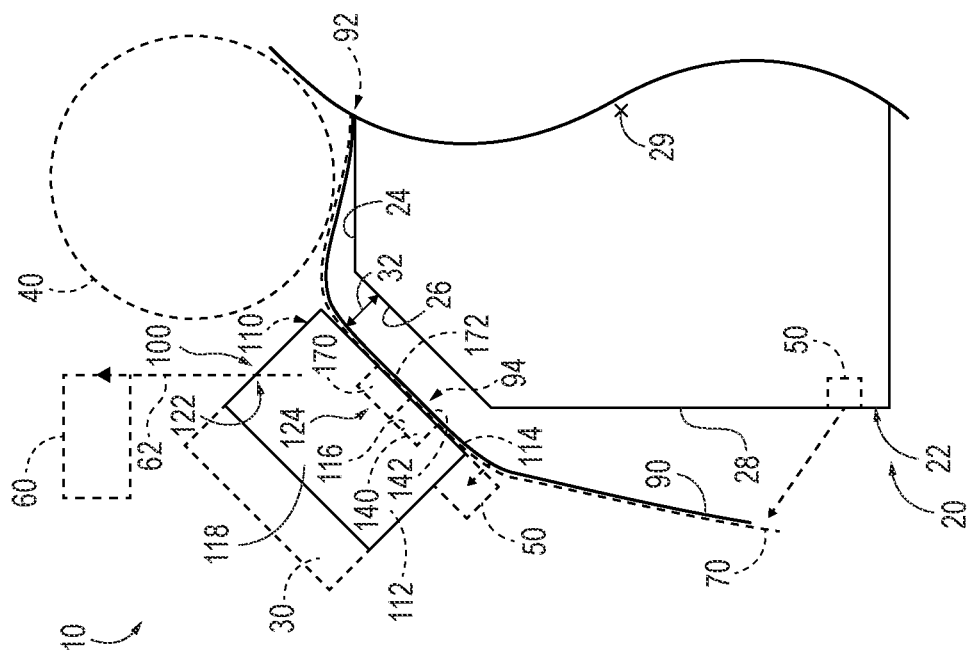
FIG. 3 is a schematic end view illustrating examples of a forming process performed utilizing a forming system that includes an elongate end effector, according to the present disclosure.
Figure 11:
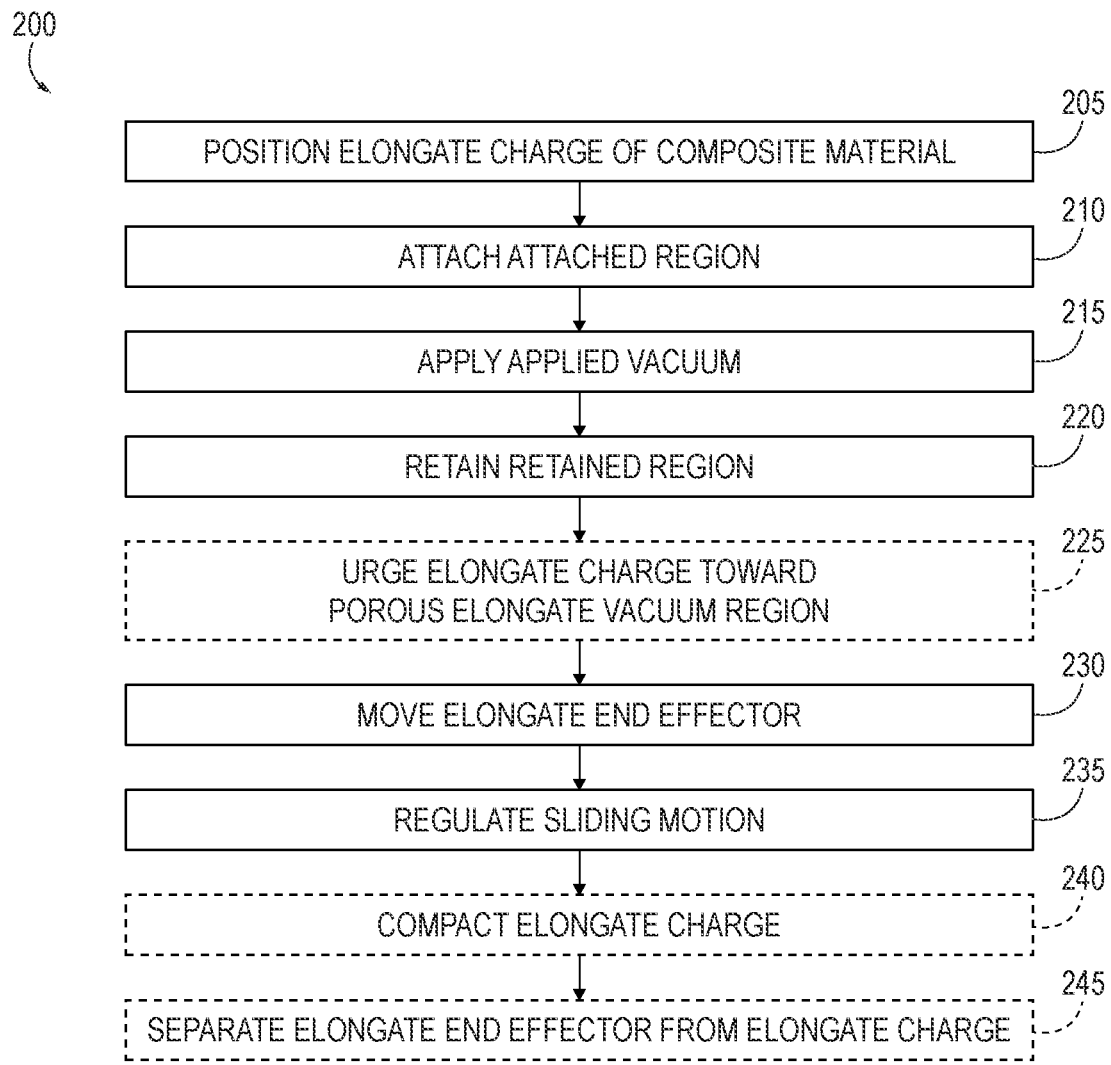
FIG. 11 is a flowchart depicting examples of methods of tensioning an elongate charge of composite material across an elongate forming surface of an elongate forming tool, according to the present disclosure.

During operation of forming systems 10, and as discussed in more detail herein with reference to methods 200 of FIG. 11, elongate charge of composite material 90 may be positioned on elongate forming surface 22 of elongate forming tool 20, such as may be illustrated in FIG. 2. Subsequently, an attached region 92 of elongate charge of composite material 90 may be operatively attached to, adhered to, and/or otherwise engaged with elongate forming surface 22, as illustrated in FIG. 3; and a retained region 94 of elongate charge of composite material 90 may be retained on elongate end effector 100, such as via application of applied vacuum 62 to vacuum inlet 122 of elongate end effector 100, as also illustrated in FIG. 3. In some examples, a charge positioning structure 50 may be utilized to urge elongate charge of composite material 90 toward and/or into contact with elongate end effector 100, such as to permit and/or to facilitate retention of elongate charge of composite material

90 by elongate end effector 100. This is indicated by the dashed arrow extending from charge positioning structure 50 in FIG. 3.

Figure 4:
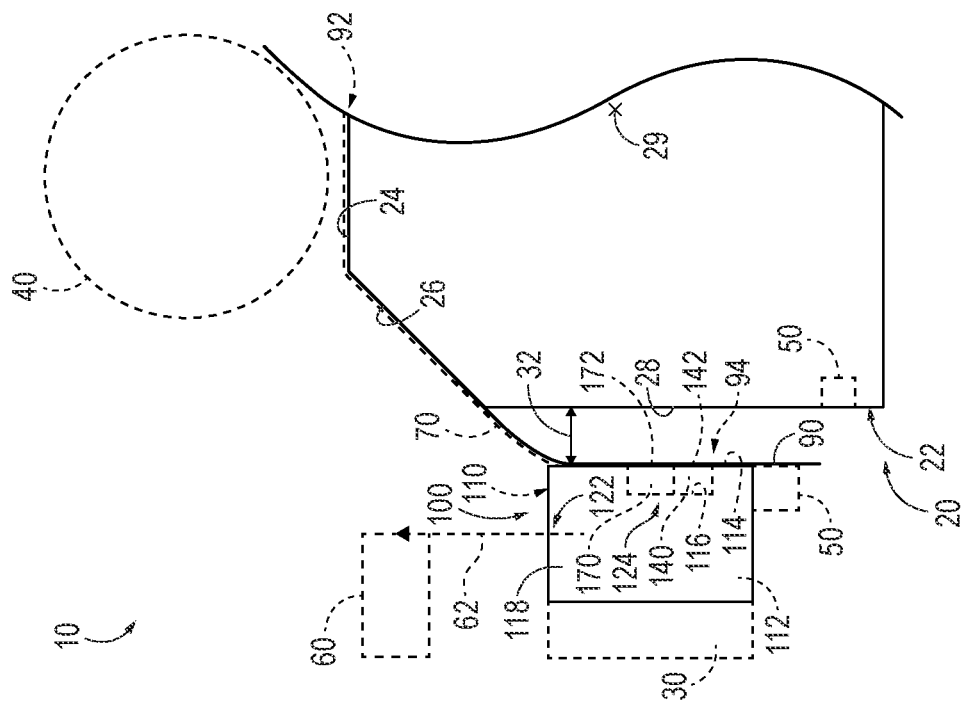
FIG. 4 is a schematic end view illustrating examples of a forming process performed utilizing a forming system that includes an elongate end effector, according to the present disclosure.

Subsequently, elongate end effector 100 may be moved, such as via end effector positioning structure 30, away from attached region 92 to tension elongate charge of composite material 90 across elongate forming surface 22, as indicated by the transition from the configuration that is illustrated in FIG. 3 to the configuration that is illustrated in FIG. 4. Elongate end effector 100 and/or end effector positioning structure 30 may be configured such that, during at least a subset of this motion, elongate end effector 100 maintains a target spacing 32 from elongate forming surface 22, as indicated at 32 in FIGS. 2-5. This may permit and/or facilitate accurate and/or reproducible tensioning of elongate charge of composite material 90 across elongate forming surface 22.

Elongate end effector 100 additionally or alternatively may be configured such that, during the motion of elongate end effector 100, elongate end effector 100 resists a sliding motion of elongate charge of composite material 90 thereacross when a shear force between elongate charge of composite material 90 and elongate end effector 100 is less than a threshold shear force magnitude but permits the sliding motion when the shear force is greater than the threshold shear force magnitude. The threshold shear force magnitude may be such that, during the motion of elongate end effector 100, elongate charge of composite material 90 is tensioned across elongate forming surface 22 without being damaged and/or torn.

The motion of elongate end effector 100 relative to elongate forming surface 22 and/or the sliding motion between the elongate end effector 100 and elongate charge of composite material 90 may continue until an entirety, or at least a substantial fraction, of elongate charge of composite material 90 has been tensioned across elongate forming surface 22. This is illustrated by the progression that is illustrated in FIGS. 3-6. In some examples, and as illustrated in FIG. 6, compaction structure 40 also may be utilized to compact elongate charge of composite material 90 onto and/or against elongate forming surface 22.

Elongate forming tool 20 may include any suitable structure that may form, define, and/or include elongate forming surface 22. Examples of elongate forming tool 20 include a rigid elongate forming tool 20, an at least substantially rigid elongate forming tool 20, a metallic elongate forming tool 20, a polymeric elongate forming tool 20, a wood elongate forming tool 20, a ceramic elongate forming tool 20, a carbon foam elongate forming tool 20, a polymer foam elongate forming tool 20, and/or a composite elongate forming tool 20. Elongate forming tool 20 may have and/or define a forming tool length. Examples of the forming tool length include lengths of at least 2 meters (m), at least 5 m, at least 10 m, at least 20 m, at least 30 m, at least 40 m, at least 50 m, at most 80 m, at most 70 m, at most 60 m, at most 50 m, at most 40 m, and/or at most 30 m.

Elongate forming surface 22 may have and/or define any suitable shape. In some examples, elongate forming surface 22 may include an upper forming surface region 24, a lower forming surface region 28, and/or a transition region 26, which may extend and/or transition between upper forming surface region 24 and lower forming surface region 28. In some such examples, upper forming surface region 24 may include and/or be a horizontal, or at least substantially horizontal, upper forming surface region; however, this particular orientation is not required. In some such examples, lower forming surface region 28 may include and/or be a vertical, or at least substantially vertical, lower forming surface region; however, this particular orientation is not required. In some such examples, upper forming surface region 24 may extend perpendicular, or at least substantially perpendicular, to lower forming surface region 28. As examples, upper forming surface region 24 may extend at an angle of at least 70 degrees, at least 75 degrees, at least 80 degrees, at least 85 degrees, at most 95 degrees, at most 100 degrees, at most 105 degrees, and/or at most 110 degrees relative to lower forming surface region 28.

Transition region 26 may have and/or define any suitable shape that transitions between upper forming surface region 24 and lower forming surface region 28. As examples, transition region 26 may include and/or be an edge of, or on, elongate forming surface 22, an outer edge of, or on, elongate forming surface 22, and/or a convex region of, or on, elongate forming surface 22.

End effector positioning structure 30, when present, may operatively translate elongate end effector 100 relative to elongate forming surface 22 and/or may tension elongate charge 90 across elongate forming surface 22 in any suitable manner. In examples of forming system 10 that include a plurality of elongate end effectors 100, end effector positioning structure 30 may be associated with each, or every, elongate end effector 100 of the plurality of elongate end effectors 100 and/or forming system 10 may include a corresponding end effector positioning structure 30 for each elongate end effector 100.

In some examples of forming systems 10, end effector positioning structure 30 and elongate end effector 100 together may form and/or define an elongate charge positioning system 38, as illustrated in FIG. 2. Elongate charge positioning system 38, which also may be referred to herein as a pick-and-place system 38, may be configured to position elongate charge of composite material 90 on and/or relative to elongate forming surface 22. As an example, end effector positioning structure 30 may be utilized to position elongate end effector 100 proximate and/or in contact with a selected elongate charge of composite material 90 of a supply 96 of elongate charges of composite material 90. Elongate end effector 100 then may attach to the selected elongate charge of composite material, and end effector positioning structure 30 subsequently may position elongate end effector 100 such that elongate charge of composite material 90 is proximate elongate forming surface 22. Elongate end effector 100 then may release elongate charge of composite material 90 on elongate forming surface 22 and/or may be utilized to tension elongate charge of composite material 90 across elongate forming surface 22.

End effector positioning structure 30 may be configured to position elongate end effector 100 in any suitable manner. As examples, end effector positioning structure 30 may be configured to operatively translate the elongate end effector vertically relative to the elongate forming surface, operatively translate the elongate end effector horizontally relative to the elongate forming surface, and/or operatively rotate, or pivot, the elongate end effector within a plane that is perpendicular to an elongate axis of the elongate forming surface.

As discussed, end effector positioning structure 30 may be configured to maintain target spacing 32 between elongate end effector 100 and elongate forming surface 22 as elongate charge of composite material 90 is tensioned across elongate forming surface 22. Examples of target spacing 32 include spacings of at least 1 millimeter (mm), at least 2 mm, at least 4 mm, at least 6 mm, at least 8 mm, at least 10 mm, at least 12 mm, at least 14 mm, at least 16 mm, at least 18 mm, at least 20 mm, at least 25 mm, at least 30 mm, at most 50 mm, at most 40 mm, at most 30 mm, at most 20 mm, at most 15 mm, and/or at most 10 mm.

End effector positioning structure 30 may include any suitable structure, structures, and/or components. As examples, end effector positioning structure 30 may include a linear actuator, a linear positioner, a rotary actuator, a rotary positioner, a motor, a stepper motor, a pneumatic actuator, a hydraulic actuator, and/or an electric actuator.

Compaction structure 40, when present, may include any suitable structure that may be adapted, configured, designed, and/or constructed to compact elongate charge of composite material 90 against elongate forming surface 22. Examples of compaction structure 40 include a forming bladder configured to inflate to compact the elongate charge of composite material against the elongate forming surface, a sweep structure configured to sweep across the elongate charge of composite material to compact the elongate charge of composite material against the elongate forming surface, and a line contact structure configured move a line contact across the elongate charge of composite material to compact the elongate charge of composite material against the elongate forming surface.

Figure 5:
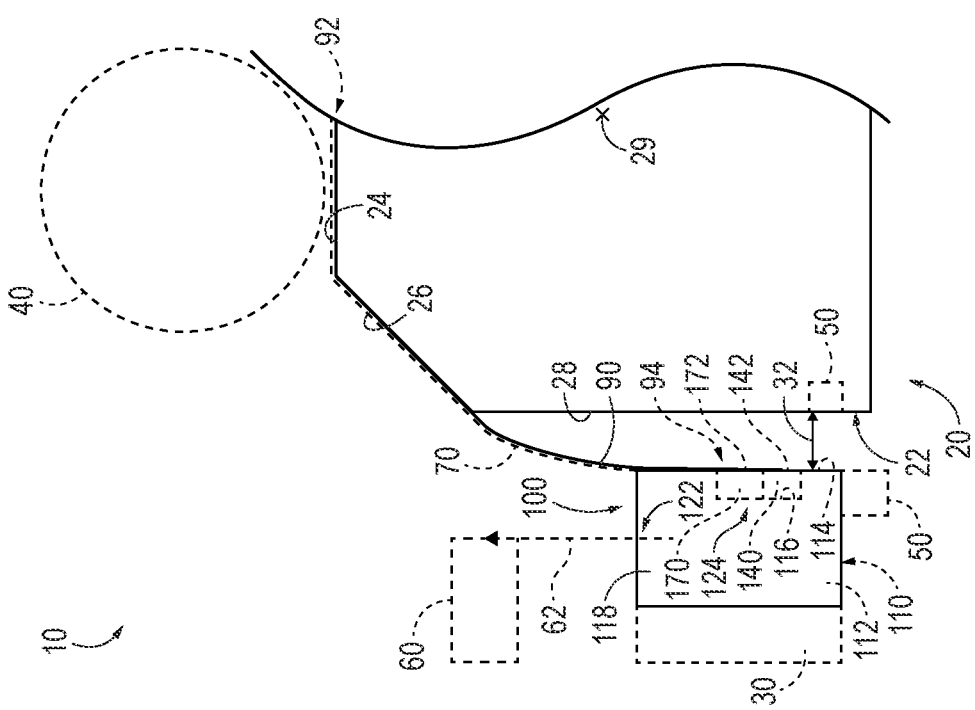
FIG. 5 is a schematic end view illustrating examples of a forming process performed utilizing a forming system that includes an elongate end effector, according to the present disclosure.

In some examples, compaction structure 40 may be configured to compact elongate charge of composite material 90 against elongate forming surface 22 while elongate end effector 100 maintains tension within elongate charge of composite material 90. In some examples, compaction structure 40 may be configured to push, or to urge, elongate end effector 100 out of contact with elongate charge of composite material 90 during compaction of elongate charge of composite material 90. This is illustrated by the transition from the configuration that is illustrated in FIG. 5 to the configuration that is illustrated in FIG. 6.

Elongate charge of composite material 90 may include any suitable structure. As an example, elongate charge of composite material 90 may include at least one ply, or layer, of composite material and/or a plurality of plies of composite material. As another example, elongate charge of composite material 90 may include only one ply of composite material. As additional examples, elongate charge of composite material 90 may include and/or be pre-impregnated composite fibers, resin-infused fiber structures, and/or thermoplastic fiber reinforced materials. As another example, elongate charge of composite material 90 may include and/or be a plurality of fibers and a resin material. Examples of the resin material a thermoset resin, an epoxy, a thermoset epoxy, an adhesive, a thermoset adhesive, a polymer, and a thermoset polymer. Examples of the plurality of fibers include a plurality of carbon fibers, a plurality of polymeric fibers, a plurality of glass fibers, a plurality of organic fibers, a plurality of inorganic fibers, and a plurality of metallic fibers.

In some examples, elongate charge of composite material 90 may include at least one ply of composite material with fibers oriented parallel, only parallel, or at least substantially parallel, to an elongate axis 29 of elongate forming tool 20. In some examples of forming systems 10, elongate charge of composite material 90 may include and/or be only one ply of composite material with fibers oriented parallel, or at least substantially parallel, to elongate axis 29 of elongate forming tool 20. Such plies of composite material, which include fibers oriented parallel to elongate axis 29, may be referred to herein as zero-degree plies and may present unique forming challenges. However, forming systems 10, according to the present disclosure, may be particularly well-suited for forming zero-degree plies, especially when compared to conventional and/or prior art forming systems.

As an example, zero-degree plies may lack rigidity in a direction that is perpendicular to elongate axis 29. As such, it may be difficult to form such zero-degree plies utilizing conventional and/or prior art forming systems without bunching and/or wrinkling of the zero-degree plies as they are formed. However, the ability of forming systems 10 to maintain tension within elongate plies of composite material 90 during forming thereof may decrease and/or eliminate such bunching and/or wrinkling.

As another example, it may be relatively easy to tear and/or damage zero-degree plies, at least when compared to plies that include fibers oriented at a skew angle relative to elongate axis 29. With this in mind, and as illustrated in dashed lines in FIGS. 2-6, forming system 10 may include, forming system 10 may be utilized with, and/or elongate charge of composite material 90 may be operatively attached to an elastomeric film 70. Elastomeric film 70, when present, may be configured to support elongate charge of composite material 90 while forming system 10 forms elongate charge of composite material 90 and/or while forming system 10 tensions elongate charge of composite material 90 across elongate forming surface 22.

Elastomeric film 70 may be positioned, within forming system 10, such that elastomeric film 70 is positioned between elongate charge of composite material 90 and elongate end effector 100 and/or physically separates, or separates, elongate charge of composite material 90 and elongate end effector 100 while elongate end effector 100 tensions elongate charge of composite material 90 across elongate forming surface 22. Such a configuration may decrease a potential for, or avoid, direct physical contact between elongate end effector 100 and elongate charge of composite material 90 and/or may decrease a potential for damage to, or contamination of, elongate charge of composite material 90 while being tensioned across elongate forming surface 22. Such a configuration additionally or alternatively may permit elastomeric film 70 to be separated from elongate charge of composite material 90 subsequent to elongate charge of composite material 90 being tensioned across elongate forming surface 22, thereby permitting a subsequent elongate charge of composite material 90 to be tensioned across elongate forming surface 22 in direct physical contact with any previously tensioned elongate charges of composite material 90.

The presence of elastomeric film 70 additionally or alternatively may decrease and/or eliminate the potential to tear and/or damage zero-degree plies while the zero-degree plies are tensioned across elongate forming surface 22. Stated another way, elastomeric film 70 may provide additional support for fibers within elongate charge of composite material 90 and/or may limit an extent to which elongate charge of composite material 90 may be stretched and/or deformed while being tensioned across elongate forming surface 22.

Elastomeric film 70 may include and/or be formed from any suitable film material. Examples of the film material include an elastomeric film material, a resilient film material, a composite film material, one or more plies of composite material, a stretchable film material, and/or a polymeric film material. Another example of the film material include a contact-approved film material, which is approved for contact with and/or will not contaminate elongate charge of composite material 90. Yet another example of the film material includes a film material that provides a desired, or target, coefficient of sliding friction with elongate end effector 100, such as may permit the sliding motion between elongate end effector 100 and elongate charge of composite material 90 when the shear force is greater than the threshold shear force magnitude, as discussed herein. In some examples, elastomeric film 70 may include and/or be a continuous, or a solid, elastomeric film 70. In some examples, elastomeric film 70 may include and/or be a perforated elastomeric film 70. Elastomeric film 70 also may be referred to herein as and/or may be a resilient film 70, a composite film 70, one or more plies of composite material 90, a stretchable film 70, and/or a polymeric film 70.

Charge positioning structure 50, when present, may include any suitable structure that may, or that may be utilized to, selectively urge elongate charge of composite material 90 into contact with elongate end effector 100 and/or with porous elongate vacuum region 142 of elongate end effector 100. This may include selectively urging elongate charge of composite material 90 into contact with elongate end effector 100 while elongate charge of composite material 90 is positioned on elongate forming surface 22 and/or while elongate end effector 100 is positioned proximate elongate forming surface 22, as illustrated in FIG. 3. As examples, charge positioning structure 50 include and/or a plurality of air nozzles configured to selectively emit an air stream that urges the elongate charge of composite material toward, or into contact with, the elongate end effector, an air knife configured to selectively emit an air stream that urges the elongate charge of composite material toward, or into contact with, the elongate end effector, and/or a mechanical assembly configured to selectively urge the elongate charge of composite material toward, or into contact with, the elongate end effector.

Charge positioning structure 50 may be operatively attached to, may form a portion of, and/or may be at least partially defined by elongate forming tool 20 and/or elongate end effector 100. In some examples, charge positioning structure 50 may be configured to move with elongate end effector 100 while elongate charge of composite material 90 is tensioned across elongate forming surface 22, as collectively illustrated by FIGS. 2-6.

As illustrated in dashed lines in FIGS. 2-5 and 7, forming system 10 may include a vacuum source 60. Vacuum source 60, when present, may be adapted, configured, designed, and/or constructed to generate applied vacuum 62 and/or to provide applied vacuum 62 to vacuum inlet 122 of elongate end effector 100. Examples of vacuum source 60 include a vacuum pump, a venturi vacuum generator, and/or a vacuum blower. Applied vacuum 62 may have any suitable vacuum magnitude, examples of which include vacuum magnitudes of at least 10 kilopascals (kPa), at least 15 kPa, at least 20 kPa, at least 25 kPa, at least 30 kPa, at least 35 kPa, at least 40 kPa, at most 60 kPa, at most 50 kPa, at most 40 kPa, at most 30 kPa, and/or at most 20 kPa.

Figure 8:
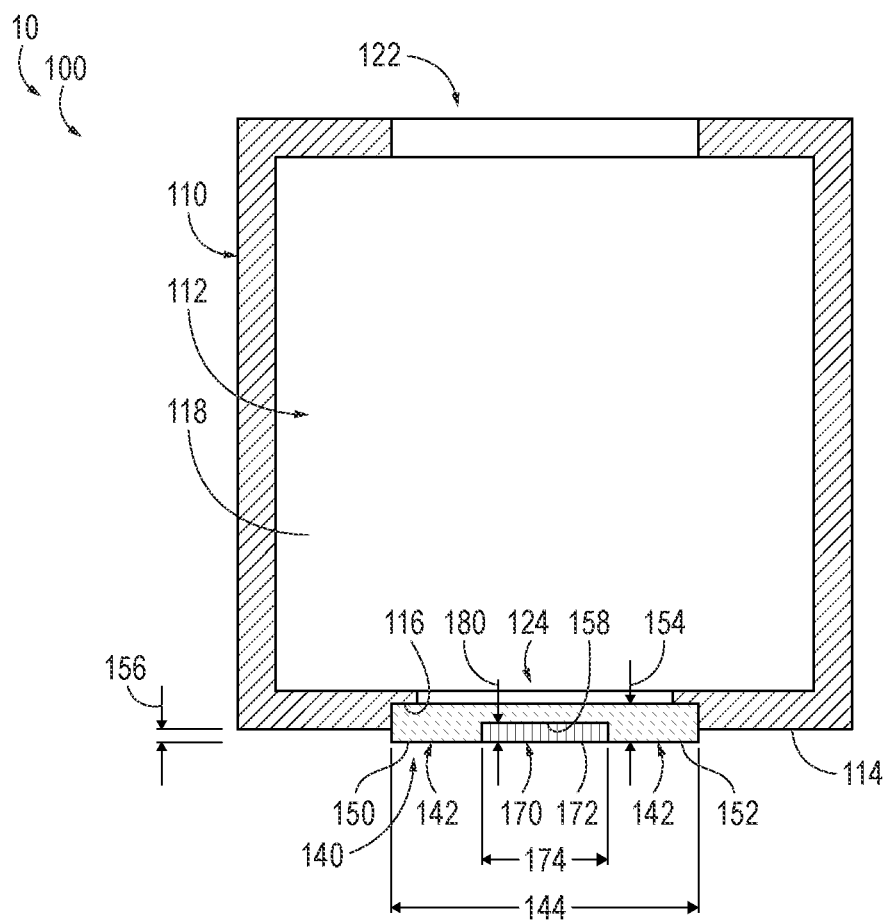
FIG. 8 is a schematic cross-sectional view illustrating an example of an elongate end effector according to the present disclosure.
Figure 9:
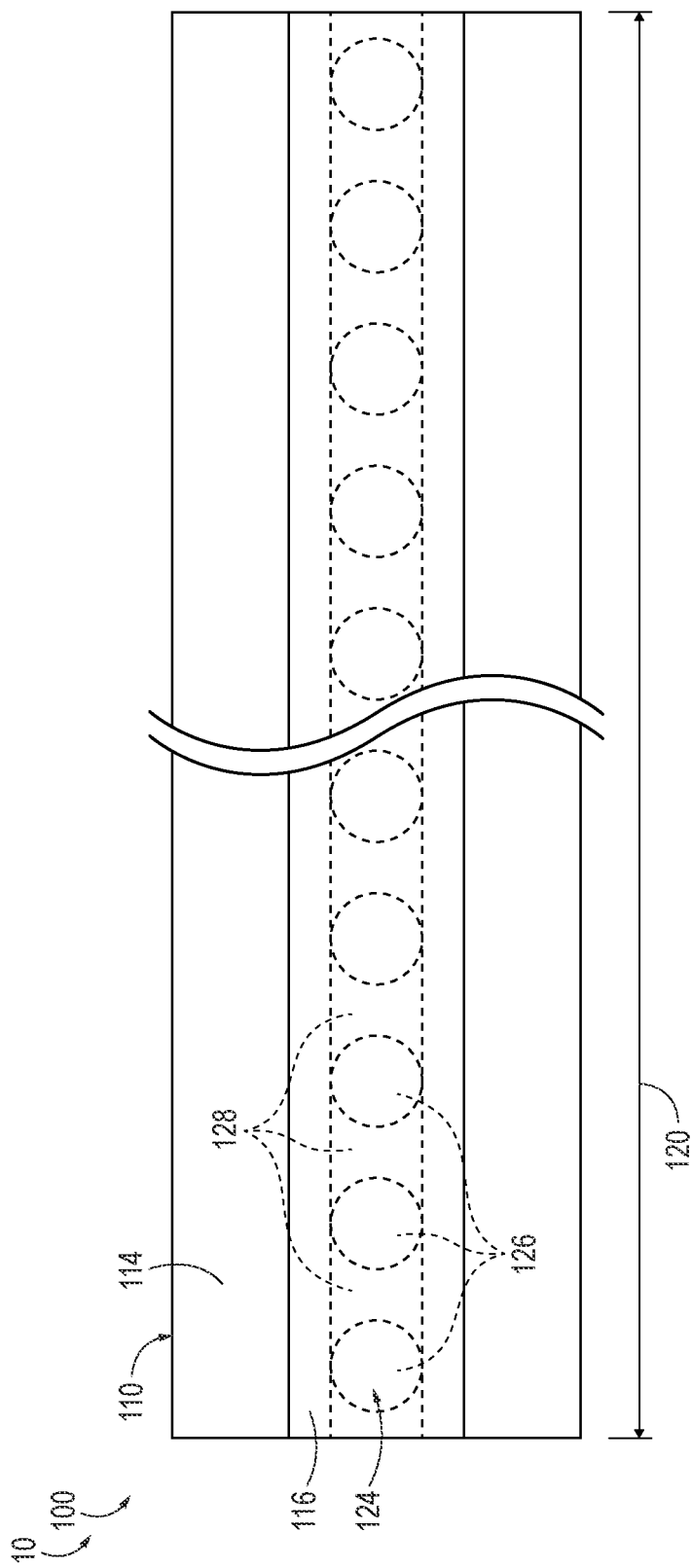
FIG. 9 is a schematic side view illustrating examples of elongate end effectors according to the present disclosure.
Figure 10:
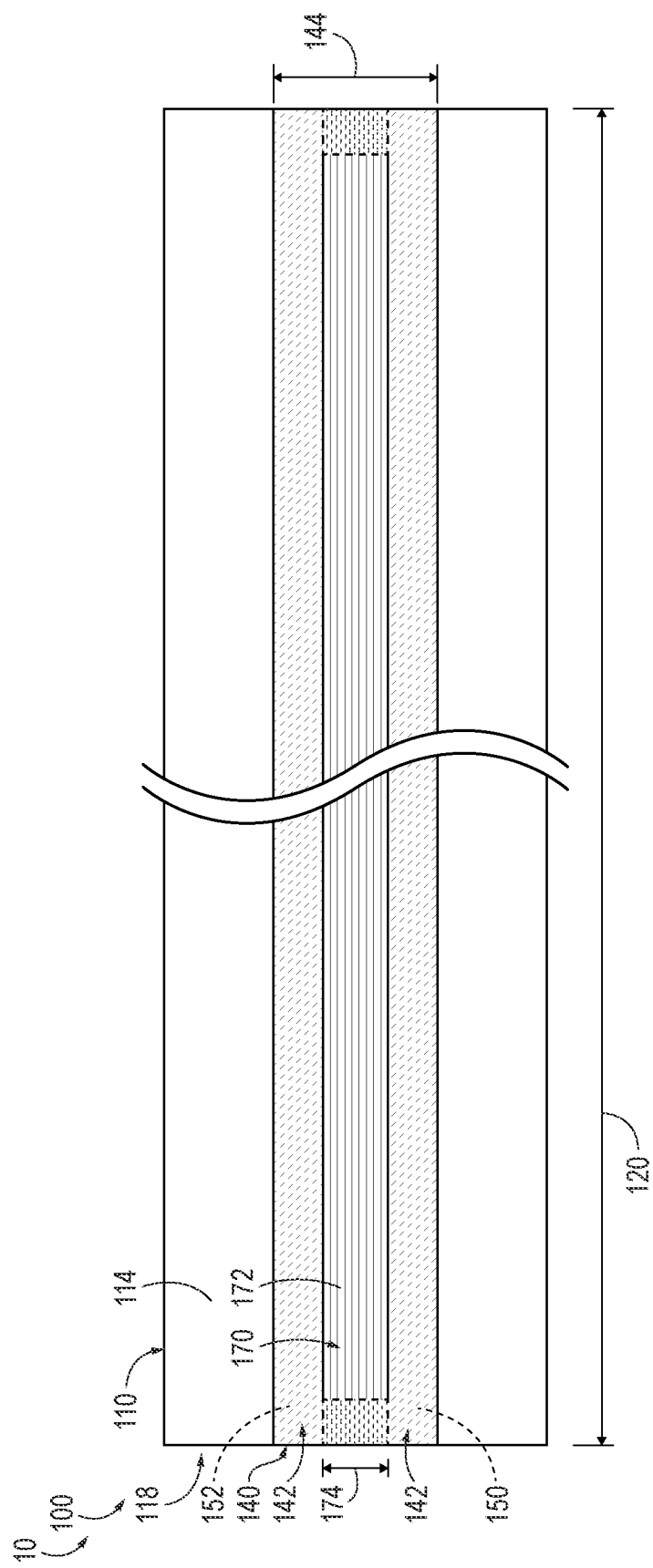
FIG. 10 is a schematic side view illustrating examples of elongate end effectors according to the present disclosure.

FIG. 8 is a schematic cross-sectional view illustrating an example of an elongate end effector 100 that may form a portion of forming systems 10, according to the present disclosure. In some examples of forming systems 10, FIG. 8 may include and/or be a cross-sectional view of elongate end effector 100 of FIG. 7 taken along line A-A of FIG. 7. FIGS. 9-10 are schematic side views illustrating examples of elongate end effectors 100 that may form a portion of forming systems 10, according to the present disclosure.

Elongate end effectors 100 of FIGS. 8-10 may include and/or be more detailed views of elongate end effectors 100 of FIGS. 2-7. With this in mind, any of the structures, functions, and/or features that are disclosed herein with reference to elongate end effectors 100 of FIGS. 8-10 may be included in and/or utilized with elongate end effectors 100 and/or forming systems 10 of FIGS. 2-7 without departing from the scope of the present disclosure. Similarly, any of the structures, functions, and/or features that are disclosed herein with reference to end effectors 100 and/or forming systems 10 of FIGS. 2-7 may be included in and/or utilized with elongate end effectors 100 of FIGS. 8-10 without departing from the scope of the present disclosure.

As collectively illustrated by FIGS. 8-10, and as discussed, elongate end effectors 100 include elongate vacuum distribution manifold 118. Elongate vacuum distribution manifold 118 includes vacuum inlet 122 and vacuum outlet 124. Elongate end effectors 100 also include porous elongate vacuum region 142 and may include an elongate friction surface 172. Elongate friction surface 172, when present, may extend along a length of porous elongate vacuum region 142, and porous elongate vacuum region 142 and/or elongate friction surface 172 may be configured to generate a frictional force that resists a sliding motion between elongate end effector 100 and elongate charge of composite material 90, as discussed in more detail herein. For clarity, FIG. 9 illustrates examples of elongate end effectors 100 without porous elongate vacuum region 142 and/or elongate friction surface 172 associated with and/or covering vacuum outlet 124, while FIG. 10 illustrates elongate end effectors 100 with porous elongate vacuum region 142 and elongate friction surface 172 associated with and/or covering vacuum outlet 124.

Elongate vacuum distribution manifold 118 may include and/or may be defined by any suitable structure. As an example, elongate vacuum distribution manifold 118 may be defined by a manifold body 110. Examples of manifold body 110 include an elongate manifold body, a tubular elongate manifold body, a rigid, or at least substantially rigid, elongate manifold body, a flexible manifold body, a metallic manifold body, and/or a polymeric manifold body. In some examples, manifold body 110 may include and/or be a single, a continuous, and/or a monolithic manifold body 110. In some examples, elongate vacuum distribution manifold 118 may be defined by a plurality of distinct, or spaced-apart, manifold bodies 110.

Vacuum outlet 124 may be defined in any suitable manner. As an example, and as perhaps best illustrated in FIG. 9, vacuum outlet 124 may be defined by a plurality of spaced-apart vacuum outlet openings 126 that may extend within, or through a region of, manifold body 110. As another example, vacuum outlet 124 may include a plurality of spaced-apart cross-supports 128, which may be configured to support, or to structurally support, porous elongate vacuum region 142. In such a configuration, spaced-apart cross-supports 128 may have and/or define any suitable spacing. As examples, spaced-apart cross-supports 128 may be spaced apart by a distance of at least 1 mm, at least 2 mm, at least 5 mm, at least 10 mm, at least 15 mm, at least 20 mm, at most 50 mm, at most 40 mm, at most 30 mm, and/or at most 20 mm. As yet another example, vacuum outlet 124 may include and/or be an elongate, a single, and/or a continuous vacuum outlet 124 that extends along a length 120, a majority of length 120, and/or an entirety of length 120 of elongate vacuum distribution manifold 118.

In some examples, manifold body 110 may define an enclosed manifold region 112, as illustrated in FIG. 8. In some such examples, vacuum inlet 122 may extend into, or be in fluid communication with, enclosed manifold region 112 and/or vacuum outlet 124, or the plurality of spaced-apart vacuum outlet openings 126, may extend from, or be in fluid communication with, enclosed manifold region 112.

Porous elongate vacuum region 142 may include and/or may be defined by any suitable structure that is configured to receive the applied vacuum from vacuum outlet 124 and/or to generate the pressure differential that retains the elongate charge of composite material in contact therewith. In some examples, porous elongate vacuum region 142 may be defined by, or at least partially by, manifold body 110. As an example, manifold body 110 may include a plurality of spaced-apart holes that may define porous elongate vacuum region 142.

In some examples, and as perhaps best illustrated in FIGS. 8 and 10, porous elongate vacuum region 142 may be operatively attached to manifold body 110. As an example, porous elongate vacuum region 142 may be defined by a strip 140 of porous material, which may be operatively attached to manifold body 110, to elongate vacuum distribution manifold 118, and/or to vacuum outlet 124. Strip 140 also may be referred to herein as a band 140 of porous material and/or as a narrow sheet 140 of porous material. Examples of strip 140 include a strip of open cell foam, a strip of open cell polyethylene foam, a strip of sintered material, and/or a strip of perforated material.

Strip 140, when present, may have any suitable porous material thickness 154, as illustrated in FIG. 8. Examples of porous material thickness 154 include thicknesses of at least 0.5 mm, at least 1 mm, at least 1.5 mm, at least 2 mm, at least 2.5 mm, at least 3 mm, at least 4 mm, or at least 5 mm, at most 10 mm, at most 9 mm, at most 8 mm, at most 7 mm, at most 6 mm, at most 5 mm, at most 4 mm, and/or at most 3 mm.

In some examples, and as illustrated in FIGS. 8-9, manifold body 110 may include and/or define a manifold body recessed region 116, which may at least partially define vacuum outlet 124. In such a configuration, strip 140 may be positioned at least partially within manifold body recessed region 116. As illustrated, manifold body recessed region 116 may support strip 140 and/or a perimeter region of strip 140.

In some examples, manifold body 110 may include and/or define an external body surface 114, and manifold body recessed region 116 may extend into manifold body 110, into external body surface 114, and/or away from external body surface 114. In some such examples, strip 140 may project from external body surface 114 by a body projection distance 156, as illustrated in FIG. 8. Such a configuration may increase a potential for porous elongate vacuum region 142 to engage with and/or retain the elongate charge of composite material when the applied vacuum is applied to vacuum inlet 122. Examples of body projection distance 156 include distances of at least 0.1 mm, at least 0.15 mm, at least 0.2 mm, at least 0.25 mm, at least 0.3 mm, at least 0.4 mm, at least 0.5 mm, at most 1 mm, at most 0.9 mm, at most 0.8 mm, at most 0.7 mm, at most 0.6 mm, at most 0.5 mm, at most 0.4 mm, and/or at most 0.3 mm.

In some examples, and as illustrated in FIGS. 8 and 10, porous elongate vacuum region 142 may include a first porous elongate vacuum region 150 and a second porous elongate vacuum region 152. In such a configuration, elongate friction surface 172 may extend between, or separate, first porous elongate vacuum region 150 and second porous elongate vacuum region 152. In some examples, porous elongate vacuum region 142 may include and/or be a planar, or an at least substantially planar, porous elongate vacuum region 142.

Porous elongate vacuum region 142 may have and/or define any suitable dimensions. As examples, porous elongate vacuum region 142 may have and/or define a vacuum surface width 144 of at least 2 mm, at least 4 mm, at least 6 mm, at least 8 mm, at least 10 mm, at most 25 mm, at most 20 mm, at most 15 mm, at most 10 mm, and/or at most 8 mm. As additional examples, porous elongate vacuum region 142 may have and/or define a vacuum surface aspect ratio, such as may be defined as a ratio of length 120 to vacuum surface width 144, of at least 100, at least 200, at least 300, at least 400, at least 500, at least 600, at least 700, at least 800, at least 900, at least 1,000, at most 5,000, at most 4,000, at most 3,000, at most 2,000, at most 1,500, and/or at most 1,000.

Elongate friction surface 172 may include and/or may be defined by any suitable structure that may extend along the length of porous elongate vacuum region 142 and/or that may be configured to generate the frictional force. In some examples, elongate friction surface 172 may be defined by, or at least partially by, manifold body 110. As an example, elongate friction surface 172 may include and/or be a roughened region of manifold body 110, a corner of manifold body 110, and/or an edge of manifold body 110. In some examples, elongate friction surface 172 may be defined by porous elongate vacuum region 142 and/or by strip 140 of porous material. As an example, elongate friction surface 172 may include and/or be a roughened region of strip 140, a corner of strip 140, and/or an edge of strip 140.

In some examples, and as perhaps best illustrated in FIGS. 8 and 10, elongate friction surface 172 may be operatively attached to manifold body 110, to elongate vacuum distribution manifold 118, and/or to strip 140 of porous material. As an example, elongate friction surface 172 may be defined by a strip 170 of friction material, which may be attached to manifold body 110 and/or to strip 140 of porous material. In some such examples, strip 140 may include and/or may define a porous material recessed region 158, as illustrated in FIG. 8. Porous material recessed region 158, when present, may be configured to receive strip 170 of friction material. Strip 170 of friction material also may be referred to herein as a band 170 of friction material and/or as a narrow sheet 170 of friction material.

In some examples, porous elongate vacuum region 142 may be planar, or at least substantially planar, with elongate friction surface 172. In some examples, porous elongate vacuum region 142 may include a smooth, curved, arcuate, and/or radiused vacuum surface edge, or region, 160, as illustrated in dashed lines in FIG. 2. Additionally or alternatively, elongate friction surface 172 may include a smooth, curved, arcuate, and/or radiused friction surface edge, or region, 176, as also illustrated in FIG. 2.

Strip 170 of friction material may include and/or may be defined by any suitable structure. As examples, strip 170 may include and/or be a strip 170 of resilient material, a strip 170 of textured material, a strip 170 of material that exhibits a coefficient of static friction greater than that of porous elongate vacuum region 142, a strip 170 of material that exhibits a coefficient of kinetic friction that is greater than that of porous elongate vacuum region 142, and/or a strip 170 of rubber. In a specific example, elongate friction surface 172 and/or strip 170 of friction material may include and/or may be defined by a roughened surface, such as a grit blasted surface.

As illustrated in FIG. 8, strip 170 of friction material may define a friction material thickness 180. Examples of friction material thickness 180 include thicknesses of at least 0.5 mm, at least 1 mm, at least 1.5 mm, at least 2 mm, at least 2.5 mm, at least 3 mm, at least 4 mm, at least 5 mm, at most 10 mm, at most 9 mm, at most 8 mm, at most 7 mm, at most 6 mm, at most 5 mm, at most 4 mm, and/or at most 3 mm.

Another example of friction material thickness 180 includes a thickness that is less than porous material thickness 154.

As also illustrated in FIG. 8, elongate friction surface 172 may define a friction surface width 174. Examples of friction surface width 174 include widths of at least 2 mm, at least 4 mm, at least 6 mm, at least 8 mm, at least 10 mm, at most 25 mm, at most 20 mm, at most 15 mm, at most 10 mm, and/or at most 8 mm.

Elongate friction surface 172 may define any suitable friction surface aspect ratio, such as may be defined as a ratio of length 120 to friction surface width 174. Examples of the friction surface aspect ratio include aspect ratios of at least 100, at least 200, at least 300, at least 400, at least 500, at least 600, at least 700, at least 800, at least 900, at least 1,000, at most 5,000, at most 4,000, at most 3,000, at most 2,000, at most 1,500, and/or at most 1,000.

In some examples, elongate friction surface 172 may define a friction surface area and porous elongate vacuum region 142 may define a vacuum surface area. In some such examples, the friction surface area may be a threshold multiple of the vacuum surface area. Examples of the threshold multiple include threshold multiples of at least 0.1, at least 0.2, at least 0.3, at least 0.4, at least 0.5, at least 0.6, at least 0.7, at least 0.8, at least 0.9, at least 1, at least 1.1, at least 1.2, at least 1.3, at least 1.4, at least 1.5, at most 2, at most 1.8, at most 1.6, at most 1.5 at most 1.4, at most 1.3, at most 1.2, at most 1.1, at most 1, at most 0.9, at most 0.8, at most 0.7, at most 0.6, and/or at most 0.5.

FIG. 11 is a flowchart depicting examples of methods 200 of tensioning an elongate charge of composite material across an elongate forming surface of an elongate forming tool, according to the present disclosure. Examples of the elongate charge of composite material are disclosed herein with reference to elongate charge of composite material 90. Examples of elongate forming surface are disclosed herein with reference to elongate forming surface 22. Examples of the elongate forming tool are disclosed herein with reference to elongate forming tool 20.

Methods 200 include positioning an elongate charge of composite material at 205 and attaching an attached region of the elongate charge of composite material at 210. Methods 200 also include applying an applied vacuum at 215 and retaining a retained region of the elongate charge of composite material at 220. Methods 200 may include urging the elongate charge of composite material toward a porous elongate vacuum region at 225 and include moving an elongate end effector at 230 and regulating a sliding motion at 235. Methods 200 further may include compacting the elongate charge of composite material at 240 and/or separating the elongate end effector from the elongate charge of composite material at 245.

Positioning the elongate charge of composite material at 205 may include positioning the elongate charge of composite material on the elongate forming surface. The elongate forming surface may be defined by an elongate forming tool, such as elongate forming tool 20, which is disclosed herein. The positioning at 205 may include positioning in any suitable manner. As an example, the positioning at 205 may include manually positioning the elongate charge of composite material on the elongate forming surface. As another example, the positioning at 205 may include automatically positioning the elongate charge of composite material on the elongate forming surface.

In some examples, methods 200 may be performed by a forming system, such as forming system 10, which is disclosed herein. In some such examples, the forming system may include an elongate charge positioning system, such as elongate charge positioning system 38, which may be configured to perform the positioning at 205. In some such examples, and as discussed in more detail herein, the elongate end effector may form a portion of the elongate charge positioning system.

The positioning at 205 may be performed with any suitable timing and/or sequence during methods 200. As examples, the positioning at 205 may be performed prior to the attaching at 210, the applying at 215, the retaining at 220, the urging at 225, the moving at 230, the regulating at 235, the compacting at 240, and/or the separating at 245. In a specific example, such as when the elongate end effector forms the portion of the elongate charge positioning system, the positioning at 205 may be performed subsequent to and/or concurrently with the applying at 215.

Attaching the attached region of the elongate charge of composite material at 210 may include attaching the attached region of the elongate charge of composite material to the elongate forming surface. Examples of the attached region are disclosed herein and indicated at 92. The attaching at 210 may be performed in any suitable manner. As examples, the attaching at 210 may include taping and/or adhering the attached region of the elongate charge of composite material to the elongate forming surface.

The attaching at 210 may be performed with any suitable timing and/or sequence during methods 200. As an example, the attaching at 210 may be performed subsequent to the positioning at 205. As additional examples, the attaching at 210 may be performed prior to and/or at least partially concurrently with the applying at 215, the retaining at 220, the urging at 225, the moving at 230, the regulating at 235, the compacting at 240, and/or the separating at 245.

Applying the applied vacuum at 215 may include applying the applied vacuum to generate a pressure differential across a porous elongate vacuum region of the elongate end effector. In some examples, the applying at 215 may include applying the applied vacuum to a vacuum inlet of an elongate vacuum distribution manifold of the elongate end effector. Examples of the elongate end effector are disclosed herein with reference to elongate end effector 100. Examples of the porous elongate vacuum region are disclosed herein with reference to porous elongate vacuum region 142. Examples of the vacuum inlet are disclosed herein with reference to vacuum inlet 122. Examples of the elongate vacuum distribution manifold are disclosed herein with reference to elongate vacuum distribution manifold 118.

The applying at 215 may be performed utilizing any suitable structure. As an example, the applying at 215 may be performed with, via, and/or utilizing a vacuum source, such as vacuum source 60, which is disclosed herein.

The applying at 215 may be performed with any suitable timing and/or sequence during methods 200. As examples, the applying at 215 may be performed prior to, at least partially concurrently with, and/or subsequent to the positioning at 205, the attaching at 210, the retaining at 220, the urging at 225, the moving at 230, the regulating at 235, the compacting at 240, and/or the separating at 245. In some examples, and as discussed, the applying at 215 may be performed prior to the positioning at 205 and/or to facilitate the positioning at 205.

Retaining the retained region of the elongate charge of composite material at 220 may include retaining the retained region of the elongate charge of composite material on the porous elongate vacuum region of the elongate end effector. Additionally or alternatively, the retaining at 220 may include retaining via the pressure differential and/or retaining as a result of the pressure differential. Stated another way, the retaining at 220 may include retaining the retained region of the elongate charge of composite material in contact with the porous elongate vacuum region of the elongate end effector, such as via the pressure differential.

The retaining at 220 may be performed with any suitable timing and/or sequence during methods 200. As examples, the retaining at 220 may be performed prior to, at least partially concurrently with, and/or subsequent to the positioning at 205 and/or the attaching at 210. As additional examples, the retaining at 220 may be performed subsequent to and/or responsive to the applying at 215 and/or the urging at 225. As further examples, the retaining at 220 may be performed prior to and/or at least partially concurrently with the moving at 230, the regulating at 235, the compacting at 240, and/or the separating at 245.

Urging the elongate charge of composite material toward the porous elongate vacuum region at 225 may include urging the elongate charge of composite material toward and/or into contact with the elongate end effector and/or the porous elongate vacuum region. This may be accomplished in any suitable manner.

In some examples, the urging at 225 may include urging with, via, and/or utilizing a pressure differential. Stated another way, the pressure differential may, in some examples, be sufficient to urge, or to suck, the elongate charge of composite material into contact with the elongate end effector and/or with the porous elongate vacuum region thereof.

In some examples, the urging at 225 may include urging with, via, and/or utilizing a charge positioning structure, examples of which are disclosed herein with reference to charge positioning structure 50. In some such examples, the charge positioning structure may utilize a jet of air to blow and/or direct the elongate charge of composite material into contact with the elongate end effector and/or with the porous elongate vacuum region. In some examples, the charge positioning structure may utilize a mechanical actuator to mechanically move the elongate charge of composite material into contact with the elongate end effector and/or with the porous elongate vacuum region.

The urging at 225 may be performed with any suitable timing and/or sequence during methods 200. As examples, the urging at 225 may be performed subsequent to and/or at least partially concurrently with the positioning at 205, the attaching at 210, and/or the applying at 215. As another example, the urging at 225 may be performed to produce and/or generate the retaining at 220. As additional examples, the urging at 225 may be performed prior to the moving at 230, the regulating at 235, the compacting at 240, and/or the separating at 245.

Moving the elongate end effector at 230 may include moving the elongate end effector away from the attached region of the elongate charge of composite material. Additionally or alternatively, the moving at 230 may include moving the elongate end effector along a contour of the elongate forming surface and/or moving the elongate end effector to tension the elongate charge of composite material onto and/or across the elongate forming surface.

The moving at 230 may be performed in any suitable manner. As an example, the moving at 230 may be performed with, via, and/or utilizing an end effector positioning structure, examples of which are disclosed herein with reference to end effector positioning structure 30.

In some examples, the elongate charge of composite material may be supported by an elastomeric film, examples of which are disclosed herein with reference to elastomeric film 70. In some such examples, the elastomeric film may be positioned between the elongate charge of composite material and the end effector, may physically separate the elongate charge of composite material and the end effector, and/or may separate the elongate charge of composite material and the end effector during the retaining at 220, the moving at 230, and/or the regulating at 235.

In some such examples, and during the moving at 230 and/or responsive to the moving at 230, methods 200 further may include stretching the elastomeric film to tension the elongate charge of composite material across the elongate forming surface. As discussed in more detail herein, such a configuration may decrease a potential for separation of, damage to, and/or contamination of the elongate charge of composite material during the moving at 230 and/or by the elongate end effector. Also in some such examples, and subsequent to the elongate charge of composite material being completely tensioned across the elongate forming surface, methods 200 further may include separating the elastomeric film from the elongate charge of composite material by retaining the elongate charge of composite material on the elongate forming surface.

Regulating the sliding motion at 235 may include regulating the sliding motion between the elongate charge of composite material and the end effector in any suitable manner. As an example, the regulating at 235 may include resisting the sliding motion between the elongate charge of composite material and the end effector when a shear force between the elongate charge of composite material and the end effector is less than a threshold shear force magnitude. As another example, the regulating at 235 may include permitting the sliding motion when the shear force is greater than the threshold shear force magnitude.

The regulating at 235 may be performed in any suitable manner. As an example, the regulating at 235 may include passively regulating the sliding motion, such as via selection of a coefficient of friction, a coefficient of static friction, and/or a coefficient of kinetic friction between the elongate charge of composite material, or the elastomeric film, and the end effector. As another example, the regulating at 235 may include actively regulating the sliding motion, such as via selective variation of a magnitude of the pressure differential.

The regulating at 235 may be performed with any suitable timing and/or sequence during methods 200. As examples, the regulating at 235 may be performed subsequent to the positioning at 205, the attaching at 210, and/or the urging at 225. As additional examples, the regulating at 235 may be performed subsequent to, at least partially concurrently with, and/or during the applying at 215, the retaining at 220, and/or the moving at 230.

Compacting the elongate charge of composite material at 240 may include compacting the elongate charge of composite material onto and/or against the elongate forming surface. This may include compacting with, via, and/or utilizing a compaction structure, examples of which are disclosed herein with reference to compaction structure 40.

The compacting at 240 may be performed with any suitable timing and/or sequence during methods 200. As examples, the compacting at 240 may be performed subsequent to the positioning at 205, the attaching at 210, the applying at 215, the retaining at 220, and/or the urging at 225. As additional examples, the compacting at 240 may be performed subsequent to and/or at least partially concurrently with the moving at 230, the regulating at 235, and/or the separating at 245.

Separating the elongate end effector from the elongate charge of composite material at 245 may include creating and/or defining a spaced-apart relationship between the elongate end effector and the elongate charge of composite material. The separating at 245 may be performed with any suitable timing and/or sequence during methods 200. As examples, the separating at 245 may be performed subsequent to the positioning at 205, the attaching at 210, the applying at 215, the retaining at 220, the urging at 225, and/or subsequent to the regulating at 235. As additional examples, the separating at 245 may be performed during and/or at least partially responsive to the moving at 230 and/or the compacting at 240.

Illustrative, non-exclusive examples of inventive subject matter according to the present disclosure are described in the following enumerated paragraphs:

A1. An elongate end effector (100) configured to tension an elongate charge of composite material (90) across an elongate forming surface (22) of an elongate forming tool (20), the elongate end effector (100) comprising:
- an elongate vacuum distribution manifold (118) including a vacuum inlet (122), which is configured to receive an applied vacuum (62), and a vacuum outlet (124);
- a porous elongate vacuum region (142), which is configured to receive the applied vacuum (62) from the vacuum outlet (124) to generate a pressure differential that is configured to at least one of retain the elongate charge of composite material (90) in contact with the porous elongate vacuum region (142) and urge the elongate charge of composite material (90) toward, or into contact with, the porous elongate vacuum region (142); and
- optionally an elongate friction surface (172), which extends along a length of the porous elongate vacuum region (142), wherein at least one of the porous elongate vacuum region (142) and the elongate friction surface (172) is configured to generate a frictional force that resists a sliding motion between the elongate end effector (100) and the elongate charge of composite material (90).

A2. The elongate end effector (100) of paragraph A1, wherein the elongate vacuum distribution manifold (118) is defined by a manifold body (110).

A3. The elongate end effector (100) of paragraph A2, wherein the manifold body (110) is at least one of:
  (i) an elongate manifold body;
  (ii) a tubular elongate manifold body;
  (iii) a rigid, or at least substantially rigid, elongate manifold body;
  (iv) a flexible manifold body;
  (v) a metallic manifold body; and
  (vi) a polymeric manifold body.

A4. The elongate end effector (100) of any of paragraphs A2-A3, wherein at least one of:
  (i) the porous elongate vacuum region (142) is operatively attached to the manifold body (110); and
  (ii) the elongate friction surface (172) is operatively attached to the manifold body (110).

A5. The elongate end effector (100) of any of paragraphs A2-A4, wherein the vacuum outlet (124) is defined by a plurality of spaced-apart vacuum outlet openings (126) that extend within the manifold body (110).

A6. The elongate end effector (100) of paragraph A5, wherein the manifold body (110) defines an enclosed manifold region (112), wherein the vacuum inlet (122) extends into, or is in fluid communication with, the enclosed manifold region (112), and further wherein the plurality of spaced-apart vacuum outlet openings (126) extends from, or is in fluid communication with, the enclosed manifold region (112).

A7. The elongate end effector (100) of any of paragraphs A1-A6 wherein the vacuum outlet (124) is an elongate vacuum outlet that extends along a length (120) of the elongate vacuum distribution manifold (118).

A8. The elongate end effector (100) of any of paragraphs A1-A7, wherein the vacuum outlet (124) includes a plurality of spaced-apart cross-supports (128) configured to structurally support the porous elongate vacuum region (142).

A9. The elongate end effector (100) of any of paragraphs A1-A8, wherein the porous elongate vacuum region (142) is defined by a/the manifold body (110) that defines the elongate vacuum distribution manifold (118).

A10. The elongate end effector (100) of any of paragraphs A1-A9, wherein the porous elongate vacuum region (142) is defined by a strip (140) of porous material.

A11. The elongate end effector (100) of paragraph A10, wherein the strip (140) of porous material is operatively attached to at least one of the elongate vacuum distribution manifold (118), the manifold body (110), and the vacuum outlet (124).

A12. The elongate end effector (100) of any of paragraphs A10-A11, wherein the strip (140) of porous material includes at least one of:
  (i) a strip of open cell foam;
  (ii) a strip of open cell polyethylene foam;
  (iii) a strip of sintered material; and
  (iv) a strip of perforated material.

A13. The elongate end effector (100) of any of paragraphs A10-A12, wherein the strip (140) of porous material has a porous material thickness (154) of at least one of:
  (i) at least 0.5 millimeters (mm), at least 1 mm, at least 1.5 mm, at least 2 mm, at least 2.5 mm, at least 3 mm, at least 4 mm, or at least 5 mm; and
  (ii) at most 10 mm, at most 9 mm, at most 8 mm, at most 7 mm, at most 6 mm, at most 5 mm, at most 4 mm, or at most 3 mm.

A14. The elongate end effector (100) of any of paragraphs A10-A13, wherein a/the manifold body (110) includes a manifold body recessed region (116) that at least partially defines the vacuum outlet (124), and further wherein the strip (140) of porous material is positioned at least partially within the manifold body recessed region (116).

A15. The elongate end effector (100) of paragraph A14, wherein manifold body (110) includes an external body surface (114), wherein the manifold body recessed region (116) extends into the external body surface (114), and further wherein the strip (140) of porous material projects from the external body surface (114) by a body projection distance (156), optionally wherein the body projection distance (156) is at least one of:
  (i) at least 0.1 mm, at least 0.15 mm, at least 0.2 mm, at least 0.25 mm, at least 0.3 mm, at least 0.4 mm, or at least 0.5 mm; and
  (ii) at most 1 mm, at most 0.9 mm, at most 0.8 mm, at most 0.7 mm, at most 0.6 mm, at most 0.5 mm, at most 0.4 mm, or at most 0.3 mm.

A16. The elongate end effector (100) of any of paragraphs A14-A15, wherein the strip (140) of porous material includes a porous material recessed region (158) configured to receive a strip (170) of friction material that defines the elongate friction surface (172).

A17. The elongate end effector (100) of any of paragraphs A1-A16, wherein the porous elongate vacuum region (142)

is coplanar, at least partially coplanar, or at least substantially coplanar, with the elongate friction surface (172).

A18. The elongate end effector (100) of any of paragraphs A1-A17, wherein the porous elongate vacuum region (142) defines the elongate friction surface (172).

A19. The elongate end effector (100) of any of paragraphs A1-A18, wherein the porous elongate vacuum region (142) includes a first porous elongate vacuum region (150) and a second porous elongate vacuum region (152), which is spaced-apart from the first porous elongate vacuum region (150), and further wherein the elongate friction surface (172) extends between the first porous elongate vacuum region (150) and the second porous elongate vacuum region (152).

A20. The elongate end effector (100) of any of paragraphs A1-A19, wherein the porous elongate vacuum region (142) is a planar, or at least substantially planar, porous elongate vacuum region (142).

A21. The elongate end effector (100) of any of paragraphs A1-A20, wherein the porous elongate vacuum region (142) has a vacuum surface width (144) of at least one of:
 (i) at least 2 mm, at least 4 mm, at least 6 mm, at least 8 mm, or at least 10 mm; and
 (ii) at most 25 mm, at most 20 mm, at most 15 mm, at most 10 mm, or at most 8 mm.

A22. The elongate end effector (100) of any of paragraphs A1-A21, wherein the porous elongate vacuum region (142) has a vacuum surface aspect ratio of at least one of:
 (i) at least 100, at least 200, at least 300, at least 400, at least 500, at least 600, at least 700, at least 800, at least 900, or at least 1,000; and
 (ii) at most 5,000, at most 4,000, at most 3,000, at most 2,000, at most 1,500, or at most 1,000.

A23. The elongate end effector (100) of any of paragraphs A1-A22, wherein the elongate friction surface (172) is defined by a/the manifold body (110) that defines the elongate vacuum distribution manifold (118).

A24. The elongate end effector (100) of any of paragraphs A1-A23, wherein the elongate friction surface (172) is defined by a/the strip (170) of friction material.

A25. The elongate end effector (100) of paragraph A24, wherein the strip (170) of friction material is operatively attached to at least one of:
 (i) the elongate vacuum distribution manifold (118); and
 (ii) a/the strip (140) of porous material that defines the porous elongate vacuum region (142).

A26. The elongate end effector (100) of any of paragraphs A24-A25, wherein the strip (170) of friction material includes at least one of:
 (i) a strip of resilient material;
 (ii) a strip of textured material;
 (iii) a strip of material that exhibits a coefficient of static friction greater than that of the porous elongate vacuum region (142);
 (iv) a strip of material that exhibits a coefficient of kinetic friction greater than that of the porous elongate vacuum region (142); and
 (v) a strip of rubber.

A27. The elongate end effector (100) of any of paragraphs A24-A26, wherein the strip (170) of friction material has a friction material thickness (180) of at least one of:
 (i) at least 0.5 mm, at least 1 mm, at least 1.5 mm, at least 2 mm, at least 2.5 mm, at least 3 mm, at least 4 mm, or at least 5 mm;
 (ii) at most 10 mm, at most 9 mm, at most 8 mm, at most 7 mm, at most 6 mm, at most 5 mm, at most 4 mm, or at most 3 mm; and
 (iii) less than a/the porous material thickness (154) of a/the strip (140) of porous material.

A28. The elongate end effector (100) of any of paragraphs A1-A27, wherein the elongate friction surface (172) is defined by a roughened surface, optionally wherein the roughened surface includes a grit blasted surface.

A29. The elongate end effector (100) of any of paragraphs A1-A28, wherein the elongate friction surface (172) at least one of:
 (i) is a planar, or at least substantially planar, elongate friction surface (172); and
 (ii) defines an arcuate region.

A30. The elongate end effector (100) of any of paragraphs A1-A29, wherein the elongate friction surface (172) has a friction surface width (174) of at least one of:
 (i) at least 2 mm, at least 4 mm, at least 6 mm, at least 8 mm, or at least 10 mm; and
 (ii) at most 25 mm, at most 20 mm, at most 15 mm, at most 10 mm, or at most 8 mm.

A31. The elongate end effector (100) of any of paragraphs A1-A30, wherein the elongate friction surface (172) has a friction surface aspect ratio of at least one of:
 (i) at least 100, at least 200, at least 300, at least 400, at least 500, at least 600, at least 700, at least 800, at least 900, or at least 1,000; and
 (ii) at most 5,000, at most 4,000, at most 3,000, at most 2,000, at most 1,500, or at most 1,000.

A32. The elongate end effector (100) of any of paragraphs A1-A31, wherein the elongate friction surface (172) has a friction surface area, wherein the porous elongate vacuum region (142) has a vacuum surface area, wherein the friction surface area is a threshold multiple of the vacuum surface area, and further wherein the threshold multiple is at least one of:
 (i) at least 0.1, at least 0.2, at least 0.3, at least 0.4, at least 0.5, at least 0.6, at least 0.7, at least 0.8, at least 0.9, at least 1, at least 1.1, at least 1.2, at least 1.3, at least 1.4, or at least 1.5; and
 (ii) at most 2, at most 1.8, at most 1.6, at most 1.5 at most 1.4, at most 1.3, at most 1.2, at most 1.1, at most 1, at most 0.9, at most 0.8, at most 0.7, at most 0.6, or at most 0.5.

B1. A forming system (10) configured to form an elongate charge of composite material (90) to a predefined material shape, the forming system (10) comprising:
 an elongate forming tool (20) having an elongate forming surface (22) with a forming surface shape that corresponds to the predefined material shape; and
 the elongate end effector (100) of any of paragraphs A1-A32, wherein the elongate end effector (100) is configured to tension the elongate charge of composite material (90) across the elongate forming surface (22).

B2. The forming system (10) of paragraph B1, wherein the elongate forming surface (22) includes an upper forming surface region (24), a lower forming surface region (28), and a transition region (26) between the upper forming surface region (24) and the lower forming surface region (28).

B3. The forming system (10) of paragraph B2, wherein the upper forming surface region (24) is a horizontal, or at least substantially horizontal, upper forming surface region (24).

B4. The forming system (10) of any of paragraphs B2-B3, wherein the lower forming surface region (28) is a vertical, or at least substantially vertical, lower forming surface region (28).

B5. The forming system (10) of any of paragraphs B2-B4, wherein the upper forming surface region (24) extends perpendicular, or at least substantially perpendicular, to the lower forming surface region (28).

B6. The forming system (10) of any of paragraphs B2-B5, wherein the transition region (26) defines at least one of:
(i) an edge of the elongate forming surface (22);
(ii) an outer edge of the elongate forming surface (22); and
(iii) a convex region of the elongate forming surface (22).

B7. The forming system (10) of any of paragraphs B1-B6, wherein the forming system (10) further includes an end effector positioning structure (30) configured to operatively translate the elongate end effector (100), relative to the elongate forming surface (22), to tension the elongate charge of composite material (90) across the elongate forming surface (22).

B8. The forming system (10) of paragraph B7, wherein the elongate end effector (100) positioning structure (30) is configured to at least one of:
(i) operatively translate the elongate end effector (100) vertically relative to the elongate forming surface (22);
(ii) operatively translate the elongate end effector (100) horizontally relative to the elongate forming surface (22); and
(iii) operatively rotate, or pivot, the elongate end effector (100) within a plane that is perpendicular to an elongate axis (29) of the elongate forming surface (22).

B9. The forming system (10) of any of paragraphs B7-B8, wherein the elongate end effector (100) positioning structure (30) is configured to maintain a target spacing between the elongate end effector (100) and the elongate forming surface (22) while the elongate end effector (100) is operatively translated relative to the elongate forming surface (22) to tension the elongate charge of composite material (90) across the elongate forming surface (22).

B10. The forming system (10) of any of paragraphs B7-B9, wherein the elongate end effector (100) positioning structure (30) and the elongate end effector (100) together define an elongate charge positioning system (38) configured to position the elongate charge of composite material (90) on the elongate forming surface (22).

B11. The forming system (10) of any of paragraphs B1-1310, wherein the forming system (10) includes a compaction structure (40) configured to compact the elongate charge of composite material (90) against the elongate forming surface (22).

B12. The forming system (10) of paragraph B11, wherein the compaction structure (40) includes at least one of:
(i) a forming bladder configured to inflate to compact the elongate charge of composite material (90) against the elongate forming surface (22);
(ii) a sweep structure configured to sweep across the elongate charge of composite material (90) to compact the elongate charge of composite material (90) against the elongate forming surface (22); and
(iii) a line contact structure configured move a line contact across the elongate charge of composite material (90) to compact the elongate charge of composite material (90) against the elongate forming surface (22).

B13. The forming system (10) of any of paragraphs B11-B12, wherein the compaction structure (40) is configured to compact the elongate charge of composite material (90) while the elongate end effector (100) maintains tension within the elongate charge of composite material (90).

B14. The forming system (10) of any of paragraphs B11-B13, wherein the compaction structure (40) is configured to urge the elongate end effector (100) out of contact with the elongate charge of composite material (90) during compaction of the elongate charge of composite material (90).

B15. The forming system (10) of any of paragraphs B1-B14, wherein the forming system (10) further includes an elastomeric film (70) configured to support the elongate charge of composite material (90) while the forming system (10) forms the elongate charge of composite material (90).

B16. The forming system (10) of paragraph B15, wherein the elastomeric film (70) includes a polymeric film.

B17. The forming system (10) of any of paragraphs B15-B16, wherein the elastomeric film (70) at least one of is positioned between, physically separates, and separates the elongate charge of composite material (90) from the elongate end effector (100) while the elongate end effector (100) tensions the elongate charge of composite material (90) across the elongate forming surface (22).

B18. The forming system (10) of any of paragraphs B1-B17, wherein the elongate charge of composite material (90) includes at least one of:
(i) at least one ply of composite material;
(ii) only one ply of composite material; and
(iii) a plurality of plies of composite material.

B19. The forming system (10) of any of paragraphs B1-B18, wherein the elongate charge of composite material (90) at least one of:
(i) includes at least one ply of composite material with fibers oriented parallel, only parallel, or at least substantially parallel, to an elongate axis (29) of the elongate forming tool (20); and
(ii) is only one ply of composite material with fibers oriented parallel, or at least substantially parallel, to the elongate axis (29) of the elongate forming tool (20).

B20. The forming system (10) of any of paragraphs B1-B19, wherein the elongate charge of composite material (90) includes at least one of:
(i) pre-impregnated composite fibers;
(ii) resin-infused fiber structures; and
(iii) thermoplastic fiber reinforced materials.

B21. The forming system (10) of any of paragraphs B1-B20, wherein the elongate charge of composite material (90) includes, is, or is defined by, a plurality of fibers and a resin material.

B22. The forming system (10) of paragraph B21, wherein the resin material includes at least one of a thermoset resin, an epoxy, a thermoset epoxy, an adhesive, a thermoset adhesive, a polymer, and a thermoset polymer.

B23. The forming system (10) of any of paragraphs B21-B22, wherein the plurality of fibers includes at least one of a plurality of carbon fibers, a plurality of polymeric fibers, a plurality of glass fibers, a plurality of organic fibers, a plurality of inorganic fibers, and a plurality of metallic fibers.

B24. The forming system (10) of any of paragraphs B1-B23, wherein the forming system (10) includes the elongate charge of composite material (90).

B25. The forming system (10) of any of paragraphs B1-B24, in combination with the elongate charge of composite material (90).

B26. The forming system (10) of any of paragraphs B1-B25, wherein an attached region (92) of the elongate charge of composite material (90) is operatively attached to the elongate forming surface (22).

B27. The forming system (10) of any of paragraphs B1-B26, wherein a retained region (94) of the elongate charge of composite material (90) is retained on the porous elongate vacuum region (142) via a pressure differential.

B28. The forming system (10) of any of paragraphs B1-B27, wherein the forming system (10) further includes a charge positioning structure (50), and further wherein the charge positioning structure (50) is configured to selectively urge the elongate charge of composite material (90) into contact with the porous elongate vacuum region (142) of the elongate end effector (100) when the elongate charge of composite material (90) is positioned on the elongate forming surface (22) and the elongate end effector (100) is positioned proximate the elongate forming surface (22).

B29. The forming system (10) of paragraph B28, wherein the charge positioning structure (50) at least one of:
  (i) is operatively attached to the elongate forming tool (20);
  (ii) is at least partially defined by the elongate forming tool (20);
  (iii) is operatively attached to the elongate end effector (100);
  (iv) is at least partially defined by the elongate end effector (100); and
  (v) is configured to move with the elongate end effector (100) while the elongate charge of composite material (90) is tensioned across the elongate forming surface (22).

B30. The forming system (10) of any of paragraphs B28-B29, wherein the charge positioning structure (50) includes at least one of:
  (i) a plurality of air nozzles configured to selectively emit an air stream that urges the elongate charge of composite material (90) toward, or into contact with, the elongate end effector (100);
  (ii) an air knife configured to selectively emit an air stream that urges the elongate charge of composite material (90) toward, or into contact with, the elongate end effector (100); and
  (iii) a mechanical assembly configured to selectively urge the elongate charge of composite material (90) toward, or into contact with, the elongate end effector (100).

B31. The forming system (10) of any of paragraphs B1-B30, wherein the forming system (10) further includes a vacuum source (60) configured to generate the applied vacuum (62) and to provide the applied vacuum (62) to the vacuum inlet (122) of the elongate end effector (100).

B32. The forming system (10) of paragraph B31, wherein the forming system (10) is configured to generate the applied vacuum (62) with a vacuum magnitude of at least one of:
  (i) at least 10 kilopascals (kPa), at least 15 kPa, at least 20 kPa, at least 25 kPa, at least 30 kPa, at least 35 kPa, or at least 40 kPa; and
  (ii) at most 60 kPa, at most 50 kPa, at most 40 kPa, at most 30 kPa, or at most 20 kPa.

C1. A method (200) of tensioning an elongate charge of composite material (90) across an elongate forming surface (22) of an elongate forming tool (20), the method (200) comprising:
  positioning (205) the elongate charge of composite material (90) on the elongate forming surface (22);
  attaching (210) an attached region (92) of the elongate charge of composite material (90) to the elongate forming surface (22);
  applying (215) an applied vacuum (62), optionally to a vacuum inlet (122) of an elongate vacuum distribution manifold (118) of an elongate end effector (100), to generate a pressure differential across a porous elongate vacuum region (142) of the elongate end effector (100);
  at least one of:
    (i) retaining (220) a retained region (94) of the elongate charge of composite material (90) on the porous elongate vacuum region (142) via the pressure differential; and
    (ii) urging (225) the elongate charge of composite material (90) toward, or into contact with, the porous elongate vacuum region (142) via the pressure differential;
  during the retaining (220), moving (230) the elongate end effector (100) away from the attached region (92) of the elongate charge of composite material (90) to tension the elongate charge of composite material (90) across the elongate forming surface (22); and
  during the moving (230) and with at least one of the elongate end effector (100) and an elongate friction surface (172) of the elongate end effector (100), resisting a sliding motion between the elongate charge of composite material (90) and the elongate end effector (100) when a shear force between the elongate charge of composite material (90) and the at least one of the elongate end effector (100) and the elongate friction surface (172) is less than a threshold shear force magnitude and permitting the sliding motion between the elongate charge of composite material (90) and the elongate end effector (100) when the shear force is greater than the threshold shear force magnitude.

C2. The method (200) of paragraph C1, wherein, prior to the retaining (220), the method (200) further includes urging the retained region (94) of the elongate charge of composite material (90) toward the porous elongate vacuum region (142) with a charge positioning structure (50).

C3. The method (200) of any of paragraphs C1-C2, wherein the method (200) further includes compacting (240) the elongate charge of composite material (90) against the elongate forming surface (22) with a compaction structure (40).

C4. The method (200) of paragraph C3, wherein the compacting (240) is at least one of:
  (i) subsequent to the moving (230); and
  (ii) at least partially concurrent with the moving (230).

C5. The method (200) of any of paragraphs C3-C4, wherein the method (200) further includes separating (245) the elongate end effector (100) from the elongate charge of composite material (90) at least one of:
  (i) during the compacting (240); and
  (ii) responsive to the compacting (240).

C6. The method (200) of any of paragraphs C1-C5, wherein the elongate charge of composite material (90) is supported by an elastomeric film (70), and further wherein the elastomeric film (70) at least one of is positioned between, physically separates, and separates the elongate charge of composite material (90) from the elongate end effector (100) during the retaining (220), the moving (230), and the resisting.

C7. The method (200) of paragraph C6, wherein the moving (230) further includes stretching the elastomeric film (70) to tension the elongate charge of composite material (90) across the elongate forming surface (22).

C8. The method (200) of any of paragraphs C1-C7, wherein the method (200) is performed utilizing any suitable structure of the elongate end effector (100) of any of paragraphs A1-A32 and/or the forming system (10) of any of paragraphs B1-B32.

D1. The use of an elongate end effector (100), which includes both a porous elongate vacuum region (142) and an elongate friction surface (172), to tension an elongate charge of composite material (90) across an elongate forming surface (22) of an elongate forming tool (20).

D2. The use of any of the elongate end effectors (100) of any of paragraphs A1-A32 or any of the forming systems (10) of any of paragraphs B1-B32 with any of the methods (200) of any of paragraphs C1-C8.

D3. The use of any of the methods (200) of any of paragraphs C1-C8 with any of the elongate end effectors (100) of any of paragraphs A1-A32 or any of the forming systems (10) of any of paragraphs B1-B32.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A forming system configured to form an elongate charge of composite material to a predefined material shape, the forming system comprising:
   an elongate forming tool having an elongate forming surface with a forming surface shape that corresponds to the predefined material shape; and
   an elongate end effector, wherein the elongate end effector is configured to tension the elongate charge of composite material across the elongate forming surface, and further wherein the elongate end effector includes:
   (i) an elongate vacuum distribution manifold including a vacuum inlet, which is configured to receive an applied vacuum, and a vacuum outlet;
   (ii) a porous elongate vacuum region, which is configured to receive the applied vacuum from the vacuum outlet to generate a pressure differential that is configured to retain the elongate charge of composite material in contact with the porous elongate vacuum region, wherein a ratio of a length of the porous elongate vacuum region to a width of the porous elongate vacuum region is at least 100; and
   (iii) an elongate friction surface, which extends along a length of the porous elongate vacuum region, wherein the elongate friction surface is configured to generate a frictional force that resists a sliding motion between the elongate end effector and the elongate charge of composite material and exhibits a coefficient of kinetic friction that is greater than that of the porous elongate vacuum region.

2. The forming system of claim 1, wherein the elongate forming surface includes an upper forming surface region, a lower forming surface region, and a transition region between the upper forming surface region and the lower forming surface region.

3. The forming system of claim 2, wherein the transition region defines a convex region of the elongate forming surface.

4. The forming system of claim 1, wherein the forming system further includes an end effector positioning structure configured to operatively translate the elongate end effector, relative to the elongate forming surface, to tension the elongate charge of composite material across the elongate forming surface.

5. The forming system of claim 1, wherein the forming system further includes a compaction structure configured to compact the elongate charge of composite material against the elongate forming surface.

6. The forming system of claim 5, wherein the compaction structure is configured to urge the elongate end effector out of contact with the elongate charge of composite material during compaction of the elongate charge of composite material.

7. The forming system of claim 1, wherein the forming system further includes an elastomeric film configured to support the elongate charge of composite material while the forming system forms the elongate charge of composite material, wherein the elastomeric film is positioned between the elongate charge of composite material from the elongate end effector while the elongate end effector tensions the elongate charge of composite material across the elongate forming surface.

8. The forming system of claim 1, wherein the forming system further includes a charge positioning structure configured to selectively urge the elongate charge of composite material into contact with the porous elongate vacuum region of the elongate end effector when the elongate charge of composite material is positioned on the elongate forming surface and the elongate end effector is positioned proximate the elongate forming surface.

9. The forming system of claim 8, wherein the charge positioning structure includes at least one of:
   (i) a plurality of air nozzles configured to selectively emit an air stream that urges the elongate charge of composite material toward, or into contact with, the elongate end effector;
   (ii) an air knife configured to selectively emit the air stream that urges the elongate charge of composite material toward, or into contact with, the elongate end effector; and
   (iii) a mechanical assembly configured to selectively urge the elongate charge of composite material toward, or into contact with, the elongate end effector.

10. The forming system of claim 1, wherein the forming system further includes a vacuum source configured to generate the applied vacuum and to provide the applied vacuum to the vacuum inlet of the elongate end effector.

11. The forming system of claim 1, wherein the porous elongate vacuum region is defined by a strip of porous material.

12. The forming system of claim 11, wherein the strip of porous material includes at least one of:
   (i) a strip of open cell foam;
   (ii) a strip of open cell polyethylene foam;
   (iii) a strip of sintered material; and
   (iv) a strip of perforated material.

13. The forming system of claim 11, wherein the forming system includes a manifold body, which defines the elongate vacuum distribution manifold, wherein the manifold body includes a manifold body recessed region that at least partially defines the vacuum outlet, and further wherein the strip of porous material is positioned at least partially within the manifold body recessed region.

14. The forming system of claim 11, wherein the forming system further includes a strip of friction material that defines the elongate friction surface, wherein the strip of porous material includes a porous material recessed region configured to receive the strip of friction material, and further wherein the porous elongate vacuum region surrounds the elongate friction surface.

15. A method of utilizing the forming system of claim 1 to tension the elongate charge of composite material across the elongate forming surface of the elongate forming tool, the method comprising:
   positioning the elongate charge of composite material on the elongate forming surface;
   attaching an attached region of the elongate charge of composite material to the elongate forming surface;
   applying the applied vacuum to generate the pressure differential across the porous elongate vacuum region of the elongate end effector;
   retaining a retained region of the elongate charge of composite material on the porous elongate vacuum region via the pressure differential;
   during the retaining, moving the elongate end effector away from the attached region of the elongate charge of composite material to tension the elongate charge of composite material across the elongate forming surface; and
   during the moving and with the elongate end effector, resisting the sliding motion between the elongate charge of composite material and the elongate end effector when a shear force between the elongate charge of composite material and the elongate end effector is less than a threshold shear force magnitude and permitting the sliding motion between the elongate charge of composite material and the elongate end effector when the shear force is greater than the threshold shear force magnitude.

16. The method of claim 15, wherein, prior to the retaining, the method further includes urging the retained region of the elongate charge of composite material toward the porous elongate vacuum region with a charge positioning structure.

17. The method of claim 15, wherein the method further includes compacting the elongate charge of composite material against the elongate forming surface with a compaction structure, wherein the compacting is at least one of:
   (i) subsequent to the moving; and
   (ii) at least partially concurrent with the moving.

18. The method of claim 17, wherein the method further includes separating the elongate end effector from the elongate charge of composite material at least one of:
(i) during the compacting; and
(ii) responsive to the compacting.

19. A forming system configured to form an elongate charge of composite material to a predefined material shape, the forming system comprising:
- an elongate forming tool having an elongate forming surface with a forming surface shape that corresponds to the predefined material shape;
- an elongate end effector, wherein the elongate end effector is configured to tension the elongate charge of composite material across the elongate forming surface, and further wherein the elongate end effector includes:
  (i) an elongate vacuum distribution manifold including a vacuum inlet, which is configured to receive an applied vacuum, and a vacuum outlet;
  (ii) a porous elongate vacuum region, which is configured to receive the applied vacuum from the vacuum outlet to generate a pressure differential that is configured to retain the elongate charge of composite material in contact with the porous elongate vacuum region, wherein a ratio of a length of the porous elongate vacuum region to a width of the porous elongate vacuum region is at least 100; and
  (iii) an elongate friction surface, which extends along a length of the porous elongate vacuum region, wherein the elongate friction surface is configured to generate a frictional force that resists a sliding motion between the elongate end effector and the elongate charge of composite material; and
- a compaction structure configured to compact the elongate charge of composite material against the elongate forming surface while the elongate end effector maintains tension within the elongate charge of composite material, wherein the compaction structure further is configured to urge the elongate end effector out of contact with the elongate charge of composite material during compaction of the elongate charge of composite material.

20. A forming system configured to form an elongate charge of composite material to a predefined material shape, the forming system comprising:
- an elongate forming tool having an elongate forming surface with a forming surface shape that corresponds to the predefined material shape; and
- an elongate end effector, wherein the elongate end effector is configured to tension the elongate charge of composite material across the elongate forming surface, and further wherein the elongate end effector includes:
  (i) an elongate vacuum distribution manifold including a vacuum inlet, which is configured to receive an applied vacuum, and a vacuum outlet;
  (ii) a porous elongate vacuum region, which is configured to receive the applied vacuum from the vacuum outlet to generate a pressure differential that is configured to retain the elongate charge of composite material in contact with the porous elongate vacuum region, wherein a ratio of a length of the porous elongate vacuum region to a width of the porous elongate vacuum region is at least 100; and
  (iii) an elongate friction surface, which extends along a length of the porous elongate vacuum region, wherein the elongate friction surface is configured to generate a frictional force that resists a sliding motion between the elongate end effector and the elongate charge of composite material;
- wherein the porous elongate vacuum region is defined by a strip of porous material;
- wherein the forming system further includes a strip of friction material that is distinct from the strip of porous material and defines the elongate friction surface;
- wherein the strip of porous material includes a porous material recessed region configured to receive the strip of friction material and
- further wherein the porous elongate vacuum region surrounds the elongate friction surface.

* * * * *